United States Patent [19]

Miyake et al.

[11] Patent Number: 5,729,306
[45] Date of Patent: Mar. 17, 1998

[54] LIGHT SPLITTING AND SYNTHESIZING DEVICE AND LIQUID CRYSTAL DISPLAY APPARATUS INCLUDING THE SAME

[75] Inventors: Takahiro Miyake, Kyoto; Kazuhiko Ueda, Nara-ken, both of Japan

[73] Assignee: Sharp Kabushiki Kaisha, Osaka, Japan

[21] Appl. No.: 536,779

[22] Filed: Sep. 29, 1995

[30] Foreign Application Priority Data

| Sep. 30, 1994 | [JP] | Japan | 6-237587 |
| Jan. 25, 1995 | [JP] | Japan | 7-009440 |
| Feb. 20, 1995 | [JP] | Japan | 7-030324 |
| Feb. 23, 1995 | [JP] | Japan | 7-035011 |
| Jun. 29, 1995 | [JP] | Japan | 7-163988 |

[51] Int. Cl.$^6$ .................................................. G02F 1/1335
[52] U.S. Cl. ............................ 349/9; 349/57; 349/113
[58] Field of Search ............................ 359/40, 41, 53, 359/63, 15, 566; 349/5, 9, 57, 74, 96, 113

[56] References Cited

U.S. PATENT DOCUMENTS

| 5,013,107 | 5/1991 | Biles | 359/15 |
| 5,268,775 | 12/1993 | Zeidler | 359/40 |
| 5,359,455 | 10/1994 | Oishi | 359/487 |
| 5,374,968 | 12/1994 | Haven et al. | 359/40 |
| 5,404,234 | 4/1995 | Taniguchi et al. | 359/15 |
| 5,411,891 | 5/1995 | Fan et al. | 436/63 |
| 5,428,469 | 6/1995 | Willet | 359/41 |
| 5,446,510 | 8/1995 | Mitsutake et al. | 359/40 |
| 5,486,934 | 1/1996 | Huang | 359/15 |
| 5,535,055 | 7/1996 | Ono et al. | 359/495 |
| 5,555,186 | 9/1996 | Shioya | 359/40 |

FOREIGN PATENT DOCUMENTS

| 61-90584 | 5/1986 | Japan. |
| 63-132215 | 6/1988 | Japan. |
| 318581 | 2/1991 | Japan. |
| 3-196015 | 8/1991 | Japan. |
| 5-241103 | 9/1993 | Japan. |
| 0 597 261 A1 | 5/1994 | Japan. |

OTHER PUBLICATIONS

K. Yokomori, *Ricoh Technical Report*, "Dielectric Surface–Relief Gratings with High Diffraction Efficiency", No. 12, 1984; pp. 21–26. (No Month).

*Primary Examiner*—William L. Sikes
*Assistant Examiner*—Toan Ton

[57] ABSTRACT

A light splitting and synthesizing device includes: a polarized beam splitter for splitting a white light into two polarized light beams and for directing the polarized light beams toward different directions; at least one half wave plate for rotating the polarization direction of one of the polarized light beams by 90 degrees so that the polarized light beams have the same polarization; and a synthesizing prism for synthesizing the polarized light beams into one beam. The synthesizing prism includes a substrate having a pair of parallel surfaces, on one of the surfaces an array of prisms with a vertical angle of 60 degrees being formed, the polarized light beams being incident on the array of prisms and being outgoing from the other surface. The half wave plate is disposed such a position that only one of the polarized light beams is incident thereon. Each of the polarized light beams incident on the synthesizing prism enters one face of a respective prism of the prism array and is totally reflected by an opposite face of the respective prism so as to be directed toward the outgoing surface of the synthesizing prism.

7 Claims, 30 Drawing Sheets

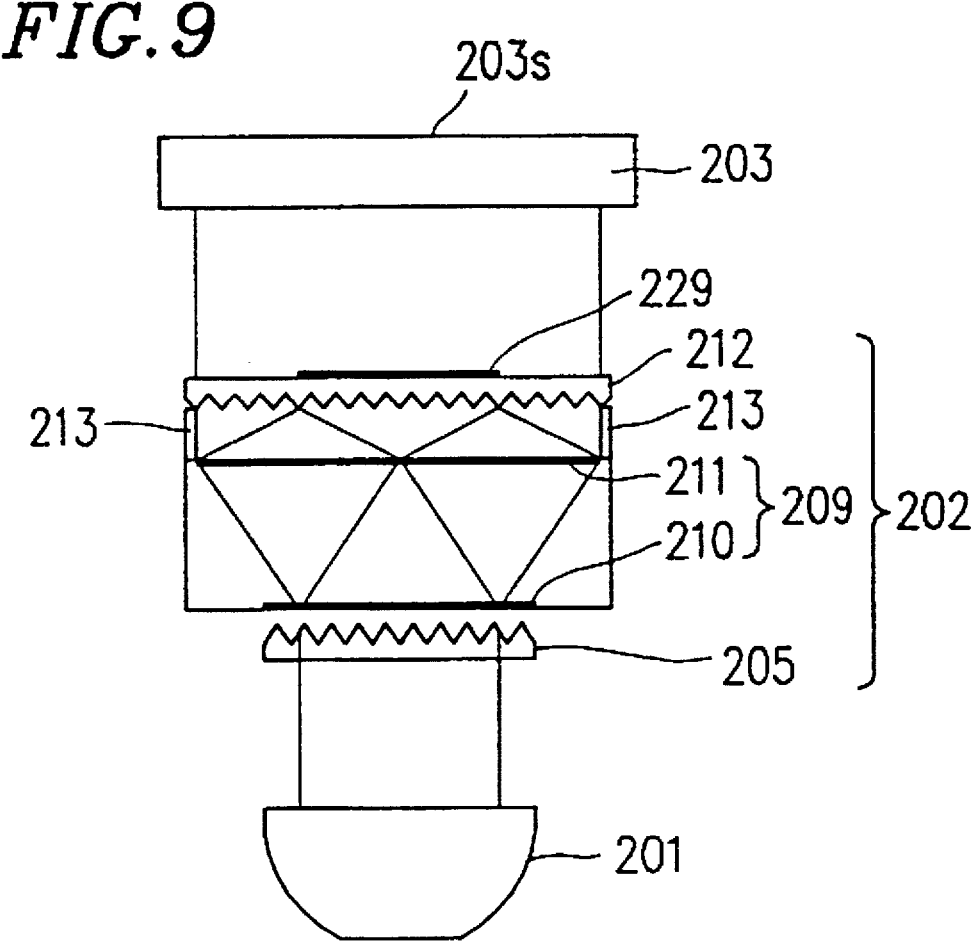

FIG.25A
Shape of incident light beam
(ellipse;
  minor axis : major axis = 1 : 2 )
FIG.25B
Shape of outgoing light beam
(circle)
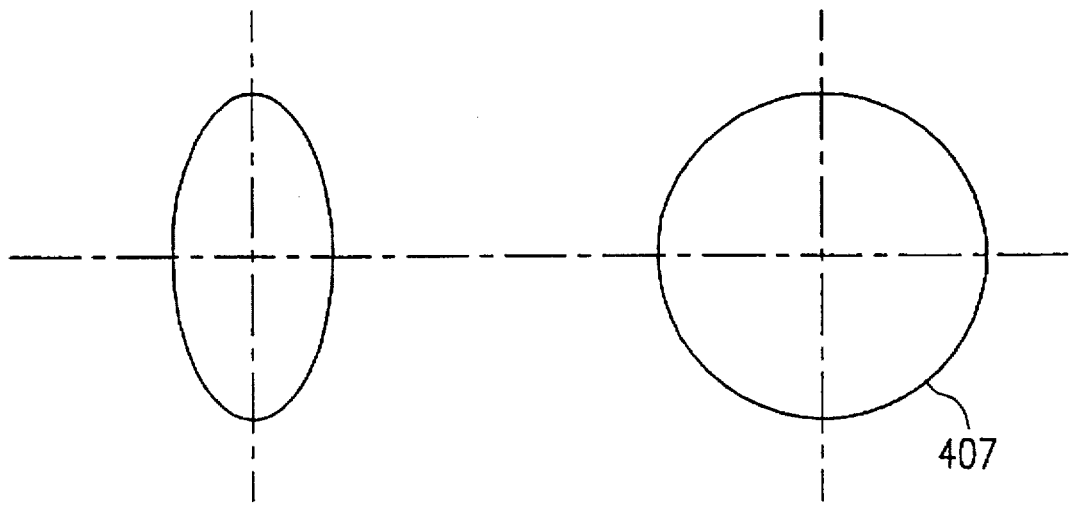
FIG.26
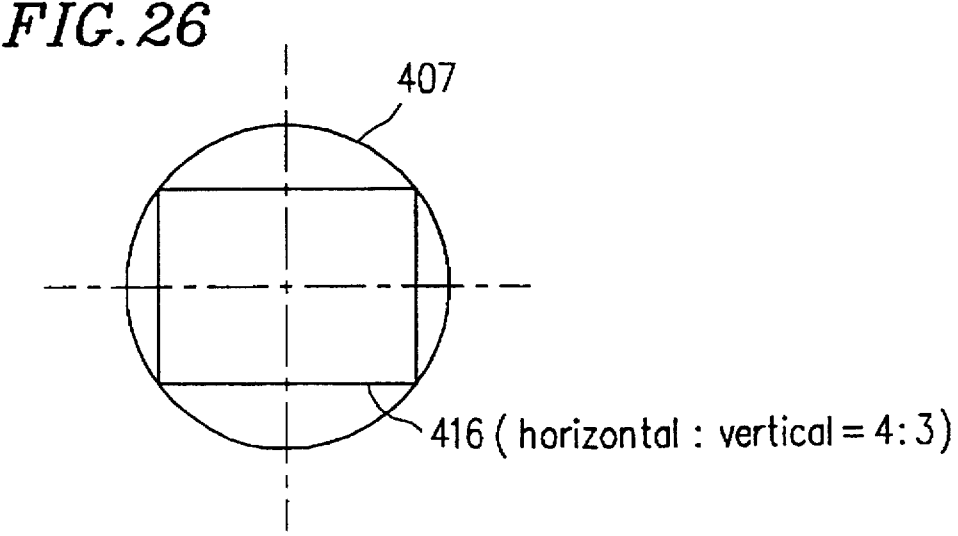

Shape of incident light beam
( ellipse;
   minor axis : major axis = M/2:N)

Shape of outgoing light beam
(ellipse)

416 ( liquid crystal panel;
   horizontal : vertical = M:N)

FIG.31A
Shape of incident light beam
(circle)
FIG.31B
Shape of outgoing beam
(ellipse;
 minor axis : major axis = substantially 1:2)
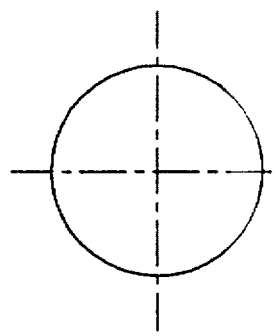
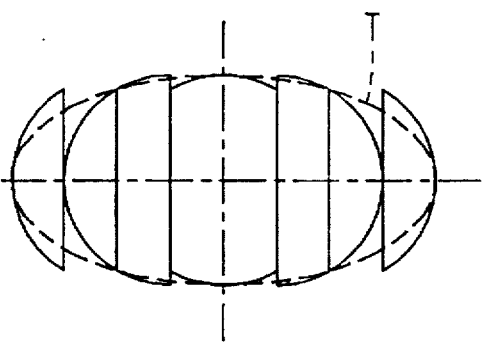
FIG.32A
Shape of incident light beam
(ellipse;
 major axis : minor axis = 2:1)
FIG.32B
Shape of outgoing beam
(substantial circle)
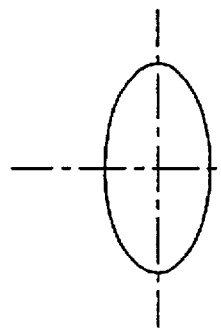
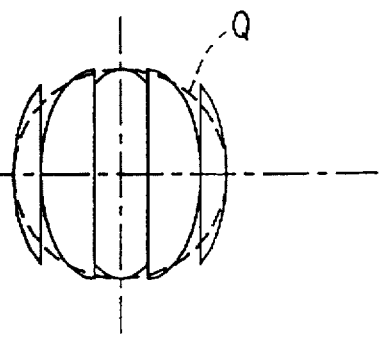

FIG.33A
Shape of incident light beam
(circle)
FIG.33B
Shape of outgoing beam
( ellipse ;
    major axis : minor axis = 2 : 1 )
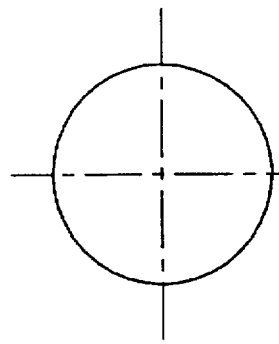
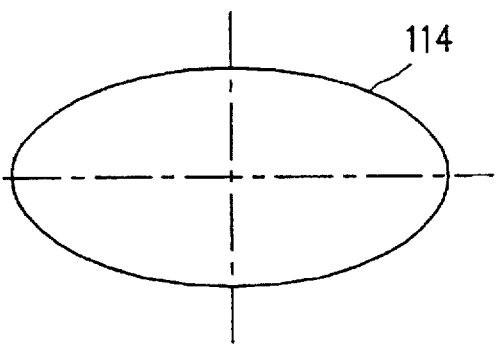
FIG.34
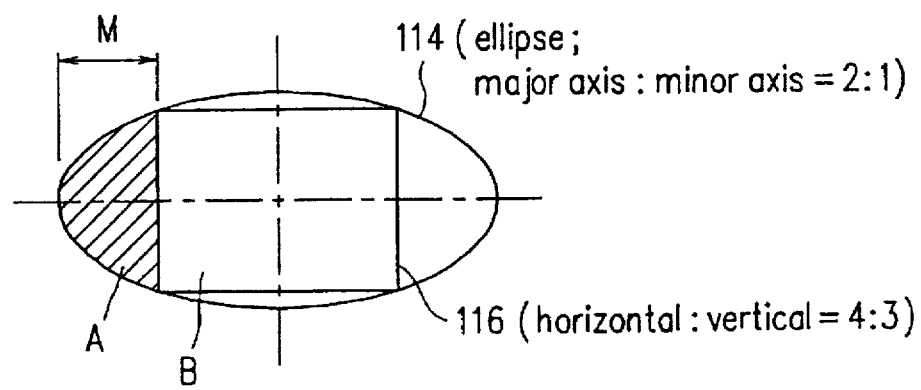

Green light    Red, blue light

| Wavelength (nm) | Color | Refractive index |
|---|---|---|
| 656.3 | Red | 1.489 |
| 546.1 | Green | 1.493 |
| 435.8 | Blue | 1.501 |

LIGHT SPLITTING AND SYNTHESIZING DEVICE AND LIQUID CRYSTAL DISPLAY APPARATUS INCLUDING THE SAME

BACKGROUND OF THE INVENTION

1. Field of the Invention

The present invention relates to a light splitting and synthesizing device for aligning different polarization directions of light emitted by a light source and a liquid crystal display apparatus including the same.

2. Description of the Related Art

Optical systems utilizing liquid crystal such as liquid crystal projection TVs are the focus of attention as replacements for conventional CRTs. Most light sources of such optical system emit linearly polarized light having one polarization direction. Such light is generally obtained by combining a light source having different polarization directions such as a metal halide lamp and a polarizing plate. In such a combination, light is incident on the polarization plate, and a polarization beam having a polarization plane perpendicular to the light transmitted through the polarizing plate is removed. Thus, light polarized in one direction is emitted. The ratio of the intensity of light transmitted through the polarizing plate for utilization with respect to the incident light is 50% or less; namely, optical loss is excessively large.

An apparatus for solving such a problem is described in, for example, Japanese Laid-Open Patent Publication No. 3-196015. In this apparatus, light from a light source is split into two linearly polarized beams, namely, a P-polarized light and an S-polarized light by a polarized beam splitter. Either the P-polarized light beam or the S-polarized light beam is allowed to transmit through the polarizing plate to have the polarization plane thereof rotated at 90 degrees. Then, the light beam thus rotated is synthesized with the unrotated light beam. In this manner, a linearly polarized light beam having one polarization direction while restricting the optical loss is obtained.

FIG. 37 shows the apparatus described in Japanese Laid-Open Patent Publication No. 3-196015. Light emitted from a light source 1 is reflected by a paraboloidal mirror 2 to be collimated, and then split into a P-polarized light beam and an S-polarized light beam by a polarized beam splitter 15. The P-polarized light beam is transmitted through a half-wave plate 4 to rotate a polarization plane thereof at 90 degrees. In this way, the P-polarized light beam is converted into an S-polarized light beam. The S-polarized light beam thus obtained and the S-polarized light beam obtained by the splitting are reflected by a reflection mirror 5 to be directed to a synthesizing prism 16. The two light beams are then refracted by a flat surface 16A on which light is to be incident and also by a prism array 16B from which light is to be outgoing. In this way, the two light beams are synthesized into parallel light and go out from the synthesizing prism 16.

As described above, linearly polarized light beams having a single polarization direction, i.e., an S-polarized light beam are obtained from the light source 1 which emits a light beam having various polarization directions. Further, the intensity of obtained light is significantly higher than the light intensity obtained without the synthesizing prism 16.

FIG. 38 shows a shape of the prism array 16B. Each prism is formed so that an angle $\theta$ between a normal line 7 with respect to a surface on which the prism array 16B is formed and an inclined face 17 of a prism will fulfill equations (1) and (2).

$$n \cdot \sin \beta = \sin \alpha \quad (1)$$

$$n \cdot \cos (\beta + \theta) = \cos \theta \quad (2)$$

where n is a refractive index of the synthesizing prism 16, $\alpha$ is an incident angle of light to the synthesizing prism 16, and $\beta$ is a refractive angle of the light after being incident on the synthesizing prism 16. The light incident on the synthesizing prism 16 accompanies refraction. The light incident at the incident angle $\alpha$ is refracted at an angle $\beta$ which fulfills equation (1), and is refracted when exiting the synthesizing prism 16 to be parallel to the normal line 7. Accordingly, the light exiting the synthesizing prism 16 needs to fulfill equations (1) and (2) to be parallel to the normal line 7.

In the case when a metal halide lamp or a halogen lamp is used as the light source 1, the light emitted from the light source 1 is not a monochromatic light having one wavelength but is white light having various wavelengths for red light, green light and blue light. In the case where an acrylic resin is used as a material of the synthesizing prism 16, the refractive index n in equation (1) depends on the wavelength of light as is shown in FIG. 39. For example, when the wavelength of the light is $\lambda=546.1$ nm, namely, when the light is green, the refractive index of the synthesizing prism 16 is n=1.493. Accordingly, assuming the incident angle of the light $\alpha=45°$, the angle $\theta$ which fulfills equation (2) is $\theta=24.0°$. The green light incident on the synthesizing prism 16 formed under such conditions at the incident angle $\alpha$ exits the synthesizing prism 16 in the state of being parallel to the normal line 7.

When the wavelength of the light is $\lambda=435.8$ nm, namely, the refractive index of the synthesizing prism 16 is n=1.501. Accordingly, if the blue light is incident on the synthesizing prism 16 with the angle $\theta$ and the incident angle $\alpha$ which are set for the green light, equations (1) and (2) are not fulfilled. In detail, the blue light exiting the synthesizing prism 16 has an angle $\gamma$ with the normal line 7. In the above-described blue light, $\gamma=1.221°$. Red light having a wavelength of $\lambda=656.3$ nm exits the synthesizing prism 16 at an angle of $\gamma=-1.564°$. In this manner, the angle of the light with the synthesizing prism 16 depends on the wavelength of the light. As a result, chromatic aberration is generated.

In the case of the apparatus shown in FIG. 37, two light beams having different incident angles are synthesized into one using refraction in the synthesizing prism 16. The refractive index of the light, which depends on the characteristics of the material of the synthesizing prism 16, changes in accordance with the wavelength of the light. As a result, the angle at which the light exits the synthesizing prism 16 changes in accordance with the wavelength, and thus chromatic aberration is generated by a disagreement of the light axes of outgoing light beams of different colors.

Further, in such an apparatus, the light exiting the synthesizing prism 16 is generally guided to, for example, a color filter in a liquid crystal panel (not shown). Due to the chromatic aberration, reduction in the light intensity and color blurs occur.

Japanese Laid-Open Patent Publication Nos. 61-90584 and 5-241103 each disclose a liquid crystal display apparatus (hereinafter, referred to as an "LCD apparatus") which uses an optical system for converting unpolarized light from the light source into linearly polarized light. FIG. 40 shows a liquid crystal display apparatus described in Japanese Laid-Open Patent Publication No. 61-90584. The apparatus includes a light source 51, a polarization direction conversion optical system 56, and a liquid crystal panel 57. The polarization direction conversion system 56 includes a polarized beam splitter 55, a total reflection plane 53 of a prism and a half wave plate 54. The light emitted from the light source 51 is split into two linearly polarized light beams, namely, a P-polarized light beam $B_P$ and an S-polarized light beam $B_S$ by a light splitting plane 52. The P-polarized light beam $B_P$ and the S-polarized light beam $B_S$ have polarization directions perpendicular to each other. The S-polarized light beam $B_S$ is reflected by the total reflection plane 53 and has the polarization direction thereof rotated at 90 degrees by the half wave plate 54 located on an optical path of the S-polarized light beam $B_S$. As a result, the S-polarized light beam $B_S$ is directed to the liquid crystal panel 57 as the P-polarized light beam $B'_P$ together with the P-polarized light beam $B_P$.

In this manner, the unpolarized light from the light source 51 becomes entirely P-polarized light, and thus the liquid crystal panel 57 is efficiently irradiated.

FIG. 41 shows a shape of a beam of the outgoing light from the polarization direction conversion system 56 on a display screen 57s of the liquid crystal panel 57. As is appreciated from FIG. 41, the display screen 57s which is of the 4:3 type or the 16:9 type can be entirely irradiated by such outgoing light.

FIG. 42 shows an LCD apparatus described in Japanese Laid-Open Patent Publication No. 5-241103. This apparatus includes a light source 61, a polarization direction conversion optical system 67, and a liquid crystal panel 66. The polarization direction conversion optical system 67 includes a pair of prism-type polarized beam splitters 62a and 62b, a pair of light reflectors 63a and 63b, and a pair of half wave plates 64a and 64b. The reflector 63a, the polarized beam splitters 62a and 62b, and the reflector 63b are arranged side by side in the direction perpendicular to the traveling direction of light beams $B_5$ and $B_6$.

Collimated light beams $B_5$ and $B_6$ of unpolarized light emitted from the light source 61 are split by light splitting planes 65a and 65b of the polarized beam splitters 62a and 62b, respectively. The light beam $B_5$ is split into two linearly polarized light beams, namely, a P-polarized light beam $B_{5P}$ and an S-polarized light beam $B_{5S}$ having polarization directions perpendicular to each other. The light beam $B_6$ is split into two linearly polarized light beams, namely, a P-polarized light beam $B_{6P}$ and an S-polarized light beam $B_{6S}$ having polarization directions perpendicular to each other. The P-polarized light beams $B_{5P}$ and $B_{6P}$ are transmitted through the light splitting planes 65a and 65b respectively and travel straight. Thus, the liquid crystal panel 66 is irradiated by the P-polarized light beams $B_{5P}$ and $B_{6P}$. The S-polarized light beams $B_{5S}$ and $B_{6S}$ are respectively reflected by the light splitting planes 65a and 65b, have the travelling directions thereof changed by the reflectors 63a and 63b, and are transmitted through the half wave plates 64a and 64b. Since the half wave plates 64a and 64b have a function of rotating the polarization directions of the linearly polarized light beams at 90 degrees, the S-polarized light beams $B_{5S}$ and $B_{6S}$ incident on the half wave plates 64a and 64b are converted into P-polarized light beams $B'_{5P}$ and $B'_{6P}$. Thereafter, the liquid crystal panel 66 is irradiated by the P-polarized light beams $B'_{5P}$ and $B'_{6P}$.

In such an arrangement, the light beams emitted by the light source 61 almost entirely become linearly polarized light having one polarization direction for irradiating the liquid crystal panel 66.

FIG. 43 shows another conventional liquid crystal display apparatus. In this apparatus, a polarization direction conversion optical system 74 includes plate-type beam splitters 71a and 71b instead of the prism-type beam splitters 62a and 62b. The plate-type beam splitters are smaller and less expensive than the prism-type beam splitters. Accordingly, the apparatus shown in FIG. 43 is produced at lower cost than the apparatus shown in FIG. 42.

In general, an LCD apparatus uses a liquid crystal panel having a size of 3 inches to 4 inches in order to have a certain level of resolution.

In the case of the conventional LCD apparatus shown in FIG. 40, a plane 55s of the polarized beam splitter 55 on which light is to be incident needs to have an area which is approximately half of the display screen 57s of the liquid crystal panel 57. Even if the liquid crystal panel 57 has a size of 3 inches to 4 inches, the plane 55s needs to be significantly large, which requires the size of the polarized beam splitter 55 to be significantly large.

Such a larger polarized beam splitter 55 enlarges the light splitting plane 52 to such a size that it is difficult to perform uniform polarization splitting. Due to the non-uniform polarization splitting, the efficiency with which the light is split into a P-polarized light beam and an S-polarized light beam is decreased, and thus light utilization efficiency of the incident light on the liquid crystal panel 57 is also lowered. As a result, the luminance of the liquid crystal panel 57 is reduced.

Such a larger polarized beam splitter 55 further involves the problem of higher production cost. Moreover, since the thickness of the polarized beam splitter 55 is also increased by such enlargement, the overall size of the LCD apparatus is increased.

The conventional LCD apparatus shown in FIG. 42 has the following problems. In the polarization direction conversion optical system 67, the light beams incident on planes 62as and 62bs of the polarized beam splitters 62a and 62b irradiate the liquid crystal panel 66 in the state of being enlarged twice in the horizontal direction. This requires the area of each of the planes 62as and 62bs to be approximately ¼ of the area of a display plane 66s of the liquid crystal display panel 66. Even if the case where the liquid crystal panel 66 has a size of 3 inches to 4 inches, the polarized beam splitters 62a and 62b are inevitably enlarged.

In the conventional LCD apparatus shown in FIG. 43, the plate-type polarized beam splitters 71a and 71b are used. The incident angle of the light on the polarized beam splitters 71a and 71b needs to be larger than on the prism-type polarized beam splitters. Thus, the polarization direction conversion optical system is larger than those in the LCD apparatuses shown in FIGS. 40 and 42.

SUMMARY OF THE INVENTION

The light splitting and synthesizing device of this invention, includes: a polarized beam splitter for splitting a white light into polarized light beams having polarizations different from each other, and for directing the polarized light beams toward different directions; polarization aligning means for changing the polarizations of part of the polarized light beams so that all of the polarized light beams emitted from polarization aligning means have the same polarization; and synthesizing prism means for synthesizing the polarized light beams into one beam, the synthesizing prism means including a substrate having a pair of parallel surfaces, on one of the surfaces an array of prisms with a vertical angle of 60 degrees being formed, the polarized light beams being incident on the array of prisms and exiting from the other surface. The polarization aligning means is disposed in such a manner that only the part of the polarized light beams is incident thereon. Each of the polarized light beams enters one face of a respective prism of the prism array and is totally reflected by an opposite face of the respective prism so as to be directed toward the outgoing surface of the synthesizing prism means.

According to another aspect of the invention, a liquid crystal display apparatus includes: the light splitting and synthesizing device described above, a light source for emitting the white light, and a liquid crystal display panel for displaying an image using the synthesized polarized light beams outgoing from the synthesizing prism means of the light splitting and synthesizing device; the light source being disposed in the first plane while the liquid crystal display panel is disposed in the second plane.

Alternatively, a liquid crystal display apparatus includes: a liquid crystal display panel; a light source for illuminating the liquid crystal display panel with light; and polarization conversion optical system, disposed in an optical path from the light source to the liquid crystal display panel, comprising a holographic optical element for splitting the light into a P-polarized light beam and an S-polarized light beam.

Alternatively, a liquid crystal display apparatus including a liquid crystal display panel, a light source for illuminating the liquid crystal panel with light and a polarization conversion optical system for linearly polarizing the light to have one polarization direction. The polarization conversion optical system includes: a first prism sheet for changing a direction in which the light from the light source travels; a first holographic optical element for splitting the light into a P-polarized light and an S-polarized light by transmitting the P-polarized light and diffracting the S-polarized light into the first order; a second holographic optical element, disposed substantially in parallel with the first holographic optical element, for transmitting the P-polarized light and diffracting the S-polarized light into the first order; reflecting means for reflecting the P-polarized light outgoing from the second holographic optical element, the reflecting means being disposed behind the second holographic optical element to be substantially perpendicular to the second holographic optical element; a second prism sheet for converging the P-polarized light and the S-polarized light to be substantially collimated; and polarization aligning means, disposed in an optical path of one of the P-polarized light and the S-polarized light travels, for rotating a polarization direction of the one of the P-polarized light and the S-polarized light by 90 degrees.

Alternatively, a liquid crystal display apparatus includes a liquid crystal display panel, a light source for illuminating the liquid crystal display panel with light and a polarization conversion optical system for linearly polarizing the light to have one polarization direction. The polarization conversion optical system includes: a pair of first polarized beam splitters for splitting a part of the light from the light source into a P-polarized light and an S-polarized light by transmitting the P-polarized light and reflecting the S-polarized light, the first polarized beam splitters being adjacent to each other and being arranged to direct the S-polarized light in opposite directions; a pair of first reflectors, disposed to sandwich the pair of first polarized beam splitters, for reflecting the S-polarized light toward the liquid crystal display panel; a pair of second reflectors for reflecting the remaining part of the light from the light source, each of the second reflectors being arranged substantially in parallel with a respective one of the first reflectors; a pair of second polarized beam splitters, disposed to sandwich the pair of the second reflectors, for splitting the remaining part of the light reflected by the second reflectors into further P-polarized light and further S-polarized light by transmitting the further P-polarized light and reflecting the further S-polarized light toward the liquid crystal display panel; a pair of third reflectors, disposed to sandwich the pair of second polarized beam splitters, for reflecting the further P-polarized light transmitted through the second polarized beam splitters toward the liquid crystal display panel; and polarization changing means, disposed in optical paths of either the P-polarized light and the further P-polarized light or the S-polarized light and the further S-polarized light, for rotating a polarization direction by 90 degrees.

According to another aspect of the invention, a light splitting and synthesizing device includes: polarization splitting means for splitting white light into linearly polarized light beams; polarization aligning means for align polarization directions of the linearly polarized light beams into one polarization direction; synthesizing means for receiving the linearly polarized light beams arranged in one direction and for emitting the linearly polarized light beams as one light beam; and shaping means for shaping the white light to have an ellipsoidal cross section before the white light is incident on the polarization splitting means, wherein a direction of the minor axis in the ellipsoidal cross section coincides with the direction in which the linearly polarized light beams are arranged when the linearly polarized light beams are synthesized.

According to another aspect of the invention, a liquid crystal display apparatus includes the light splitting and synthesizing device described above, a light source for emitting the white light, and a liquid crystal light valve having a liquid crystal display panel, wherein the liquid crystal display panel having a profile in which a ratio of a horizontal length to a vertical length is M to N, and wherein a ratio of the major axis to the minor axis in the ellipsoidal cross section of the white light to be incident on the polarization splitting means is N to M/2.

Thus, the invention described herein makes possible the advantages of (1) providing a light splitting and synthesizing device for aligning different polarization directions of the light emitted by a light source to provide outgoing light which causes no chromatic aberration, and a liquid crystal display apparatus including the same; and (2) providing a high luminance liquid crystal display apparatus which is small and easy to produce.

These and other advantages of the present invention will become apparent to those skilled in the art upon reading and understanding the following detailed description with reference to the accompanying figures.

BRIEF DESCRIPTION OF THE DRAWINGS

FIG. 9 is a schematic view of an LCD apparatus in the fourth example according to the present invention.

FIG. 25A shows a shape of an incident light on a polarized beam splitter after the light is shaped.

FIG. 25B shows a shape of light outgoing from a synthesizing prism when the incident light on the polarized beam splitter has a shape shown in FIG. 25A.

FIG. 26 shows a profile of a liquid crystal panel in the LCD apparatus shown in FIG. 24 and a shape of a light beam directed to the liquid crystal panel.

FIG. 31A shows a shape of light incident on the polarized beam splitter of the LCD apparatus shown in FIG. 30A.

FIG. 31B shows a shape of the light going out from the polarized beam splitter when the incident light has a shape shown in FIG. 31A.

FIG. 32A shows another shape of light incident on the polarized beam splitter of the LCD apparatus shown in FIG. 30A.

FIG. 32B shows a shape of the light going out from the polarized beam splitter when the incident light has a shape shown in FIG. 32A.

FIG. 33A shows a shape of light incident on the polarized beam splitter of the light splitting and synthesizing device shown in FIG. 1.

FIG. 33B shows a shape of light going out from the synthesizing prism of the light splitting and synthesizing device when the light shown in FIG. 33A is incident on the polarized beam splitter.

FIG. 34 shows a profile of a liquid crystal panel in the LCD apparatus shown in FIG. 1 and a shape of a light beam directed to the liquid crystal panel.

DESCRIPTION OF THE PREFERRED EMBODIMENTS

Hereinafter, the present invention will be described by way of illustrative examples with reference to the accompanying drawings.

EXAMPLE 1

Figure 1:
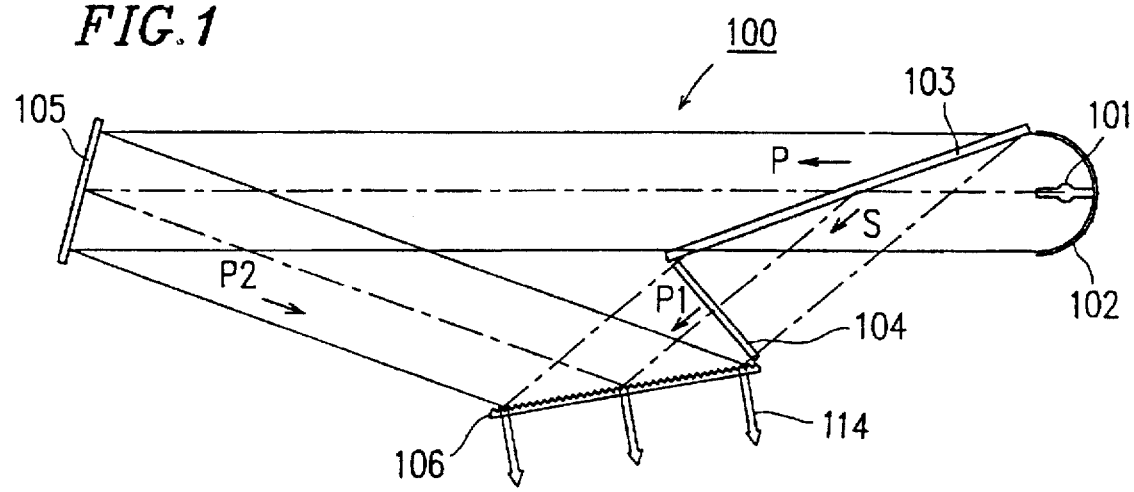
FIG. 1 is a plan view of a light splitting and synthesizing device in the first example according to the present invention.

FIG. 1 is a plan view of a light splitting and synthesizing device 100 in a first example according to the present invention. The device 100 includes a light source 101, a paraboloidal mirror 102, a mirror-type polarized beam splitter 103, a half wave plate 104, a reflection mirror 105, and a synthesizing prism 106.

The device 100 operates in the following manner.

White light emitted from the light source 101 is reflected by the paraboloidal mirror 102 to be collimated. For the light source 101, a metal halide lamp, a halogen lamp, a xenon lamp and the like are used. The collimated light is split into a P-polarized light beam which is transmitted through the polarized beam splitter 103 and an S-polarized light beam reflected by the polarized beam splitter 103. The polarized beam splitter 103 is arranged so that the direction in which the S-polarized light beam is reflected is at an angle larger than 90 degrees with respect to the direction in which the collimated light is incident on the polarized beam splitter 103. This arrangement improves light splitting performance of the polarized beam splitter 103. The S-polarized light beam is transmitted through the half wave plate 104 to have the polarization direction thereof rotated at 90 degrees and is incident on the synthesizing prism 106. The P-polarized light beam transmitted through the polarized beam splitter 103 is reflected by the reflection mirror 105 and also is incident on the synthesizing prism 106. The two light beams are synthesized into one by the synthesizing prism 106.

Figure 2:
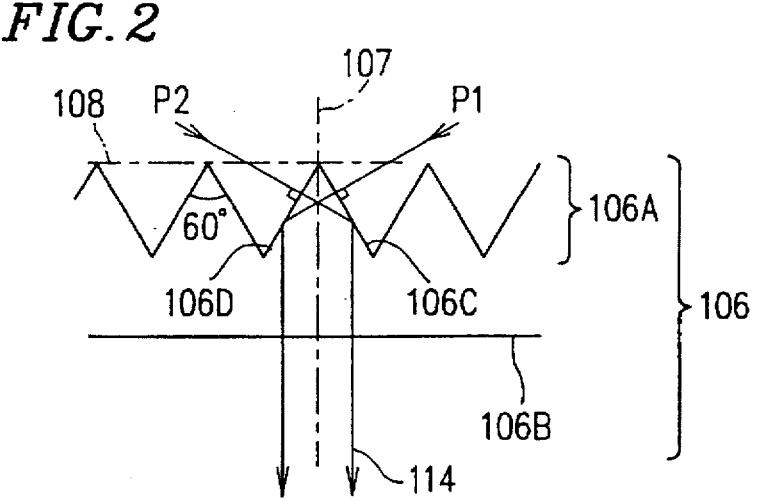
FIG. 2 shows an enlarged view of a prism array of a synthesizing prism in the light splitting and synthesizing device shown in FIG. 1.
Figure 3:
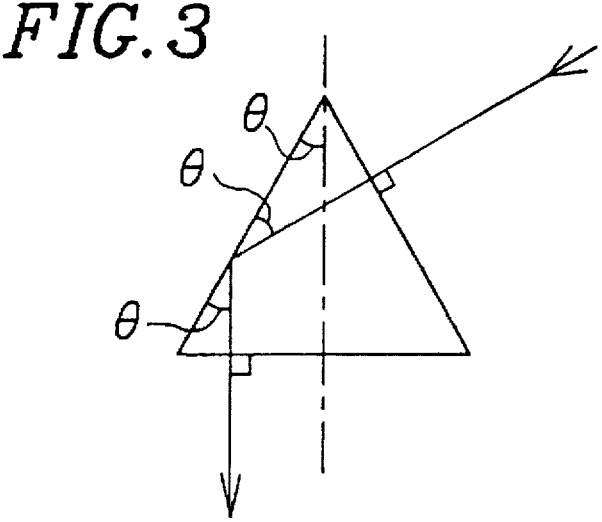
FIG. 3 shows an optical path in a prism of the prism array shown in FIG. 2.

With reference to FIGS. 2 and 3, a structure of the synthesizing prism 106 and how the light beams are synthesized will be described.

As is shown in FIG. 2, the synthesizing prism 106 includes a plurality of prisms formed on one surface of a transparent substrate having two parallel surfaces. The prisms are formed so that a plane 108 including apexes thereof will be parallel to a surface 106B which is opposite to a surface on which the prisms are formed.

Each of the prisms of the synthesizing prism 106 has two inclined faces 106C and 106D, and an angle between the inclined faces 106C and 106D is equal to an angle between the face 106C and the surface 106B and also equal to an angle between the face 106D and the surface 106B. In FIG. 3, such prisms are illustrated as equilateral triangles. In FIG. 3, a light beam is incident perpendicular to a first face of the prism, is totally reflected by a second face, and then exits the prism perpendicular to a third face. Where the total reflection angle is $\theta$, angles of apexes of the prism are each $90°-\theta$. Accordingly, the following equation is fulfilled.

$$3(90°-\theta)=180°.$$

From this equation, $\theta=30°$, and each angle of apex of the prism of the synthesizing prism 106 is 60°.

In a case of using a synthesizing prism which includes a prism of which vertical angle is less than 60°, an evenness of the light intensity in light exiting the synthesizing prism inevitably occurs. On the other hand, in the light splitting and synthesizing device in the present example, the vertical angle of each prism of the synthesizing prism 106 is set to be 60° as described above. Therefore, such an evenness of the light intensity in light exiting from the synthesizing prism can be prevented.

The light incident on the synthesizing prism 106 travels in the following manner.

As shown in FIGS. 1 and 2, two light beams are incident on the synthesizing prism 106 from different directions, namely, a light beam $P_1$ transmitted through the half wave plate 104 and a light beam $P_2$ reflected by the reflection mirror 105. In the light splitting and synthesizing device 100, the optical elements are adjusted so that light beam $P_1$ will be incident on the inclined face 106C of the prism perpendicularly to the face 106C and that the light beam $P_2$ will be incident on the inclined face 106D of the prism perpendicularly to the face 106D. Due to such an arrangement, the light beam $P_1$ incident on the prism is not refracted and thus travels in the prism while keeping the incident angle. The light beam $P_1$ is totally reflected by the inclined plane 106D in a direction 107 normal to the surface 106B opposed to the surface having the prisms, and then exits the synthesizing prism 106 perpendicular to the surface 106B.

Figure 37:
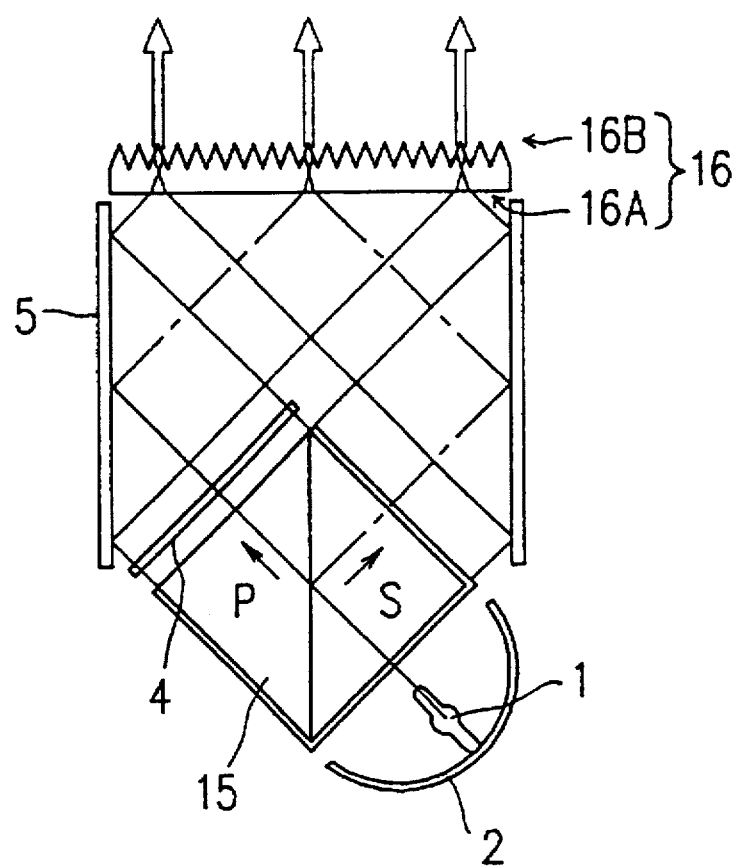
FIG. 37 is a plan view of a conventional light splitting and synthesizing device.
Figures 38, 39:
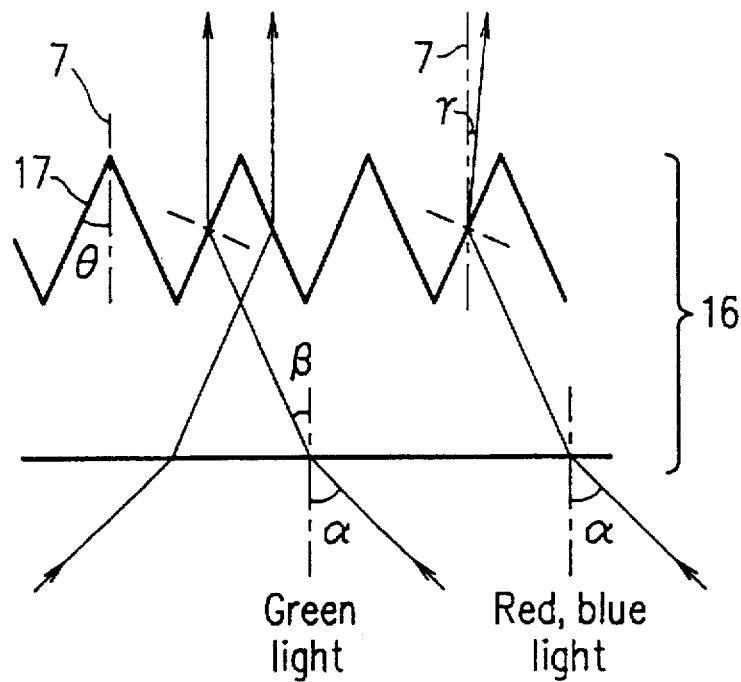
FIG. 38 shows a shape of the prism array of the synthesizing prism in the light splitting and synthesizing device shown in FIG. 37.
FIG. 39 shows a relationship between a refractive index of the synthesizing prism and the wavelength of light.

As described above, in the light splitting and synthesizing device 100 in the first example according to the present invention, refraction of the light beam $P_1$ is not utilized at all in the synthesizing prism 106 for synthesizing the light beams $P_1$ and $P_2$. Accordingly, the problem caused in the conventional light splitting and synthesizing device shown in FIG. 37, that the refractive index of the prism is different in accordance with the wavelength of the light and thus light beams having different wavelengths travel in different directions, does not occur. In the light splitting and synthesizing device 100, all the light beams having different wavelengths travel in the same direction, and thus no chromatic aberration occurs in the outgoing light.

The light beam $P_2$ reflected by the reflection mirror 105 is incident perpendicular to the inclined plane 106D and travels in the prism while keeping the incident angle. The light beam $P_2$ is totally reflected by the inclined plane 106C in the direction 107 normal to the surface 106B, and then exits the prism perpendicular to the surface 106B. Since the light beam $P_2$ is not refracted on the optical path, no chromatic aberration caused by different wavelengths occurs.

Accordingly, the light beams $P_1$ and $P_2$ incident on the inclined planes of the prism from the different directions have no chromatic aberration to each other and thus exit together as synthesized light having a single outgoing angle. The synthesized light is then directed to a liquid crystal panel (not shown).

In addition, as shown in FIG. 1, the light splitting and synthesizing device in the present example is designed so that the polarized beam splitter allows the light to be incident at a relatively large angle with respect to the normal of the light splitting plane of the polarized beam splitter and reflects the incident light in the direction which is at an angle larger than 90 degrees with respect to the direction in which the incident light travels. Such a design can improve light splitting performance of the mirror-type (plate-type) polarized beam splitter compared to the case where the mirror-type polarized beam splitter is arranged so that the light is incident thereon at a relatively small angle. Therefore, fabrication of the polarized beam splitter can be easier, resulting in reducing the cost.

EXAMPLE 2

Figure 4:
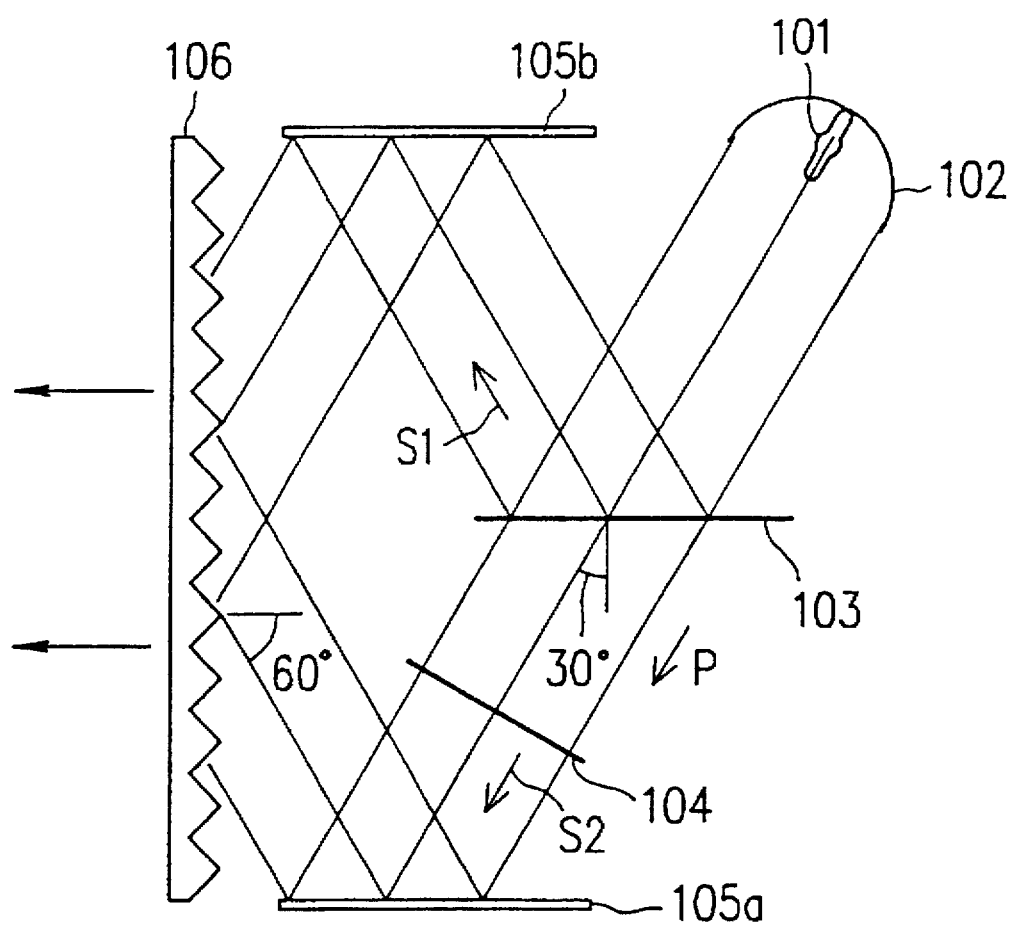
FIG. 4 is a plan view of a light splitting and synthesizing device in the second example according to the present invention.

FIG. 4 illustrates a light splitting and synthesizing device in a second example according to the present invention. A pair of reflection mirrors 105a and 105b are used instead of the reflection mirror 105. Identical elements as those in the first example will bear identical reference numerals therewith and description thereof will be omitted.

Light emitted from the light source 101 is reflected by the paraboloidal mirror 102 to be collimated. The collimated light is split into a P-polarized light beam which is transmitted through the polarized beam splitter 103 and an S-polarized light beam $S_1$ reflected by the polarized beam splitter 103. The P-polarized light beam is transmitted through the half wave plate 104 to have the polarization direction thereof rotated at 90 degrees to become an S-polarized light beam $S_2$. The S-polarized light beam $S_2$ is reflected by the reflection mirror 105a and is incident on the prism array 106A of the synthesizing prism 106. The S-polarized light beam $S_1$ reflected by the polarized beam splitter 103 is reflected again by the reflection mirror 105b and is incident on the prism array 106A of the synthesizing prism 106. The S-polarized light beams $S_1$ and $S_2$ are incident perpendicular to the respective inclined faces of the prism. Then, the S-polarized light beams $S_1$ and $S_2$ are totally reflected by the inclined faces opposed to the faces on which the S-polarized light beams $S_1$ and $S_2$ are incident. Then, the S-polarized light beams $S_1$ and $S_2$ exit from a surface 106B opposed to the prism array 106A.

In the light splitting and synthesizing device of the present example, the two light beams are not refracted in the synthesizing prism 106. Accordingly, the synthesized light outgoing from the synthesizing prism 106 has a single outgoing angle with no chromatic aberration caused by the difference in the wavelength.

EXAMPLE 3

Figure 5:
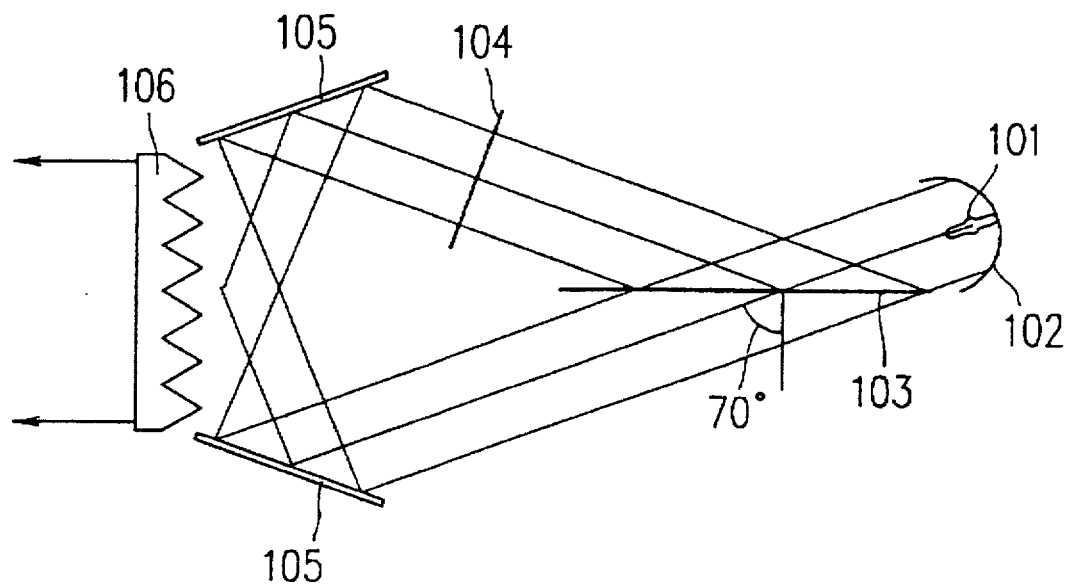
FIG. 5 shows a disadvantage of the light splitting and synthesizing device in the second example.

In the structure shown in FIG. 4, the incident angle of the light on the polarized beam splitter 103 is required to be significantly small (for example, 30 degrees). In practice, however, it is difficult and costly to produce the polarized beam splitter 103 so as to split the light incident at such a small angle. It is desirable to produce a polarized beam splitter designed for a sufficiently large incident angle, which can be produced easily and at low cost. Such a polarized beam splitter as in FIG. 5, however, requires a longer distance between the light source and the synthesizing prism. With further consideration of the distance between the polarized beam splitter and the liquid crystal panel (not shown) to which the synthesized light is guided, the whole LCD apparatus cannot be sufficiently compact.

Figure 6A:
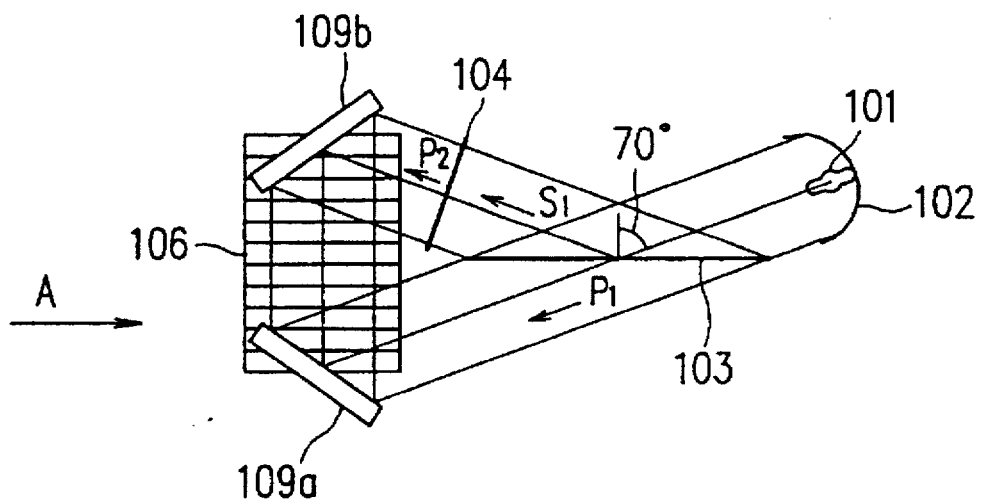
FIGS. 6A and 6B show an arrangement of an LCD apparatus in the third example according to the present invention.
Figure 6B:
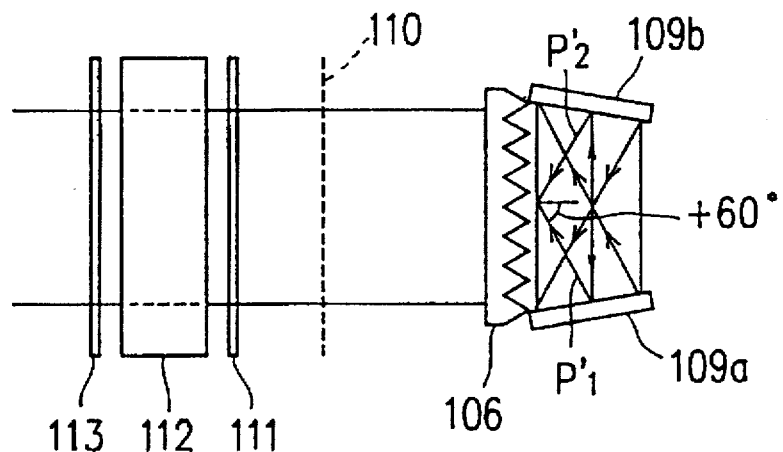

An LCD apparatus in a third example according to the present invention is shown in FIGS. 6A and 6B. The LCD apparatus includes a light splitting and synthesizing device and a liquid crystal panel. FIG. 6A is a top view of a polarization direction conversion optical system of the light splitting and synthesizing device; and FIG. 6B is a view of the light splitting and synthesizing device and the liquid crystal panel in the direction indicated by arrow A. As is appreciated from FIGS. 6A and 6B, a polarization direction conversion optical system and the liquid crystal panel are located three-dimensionally. Identical elements as those in the first example will bear identical reference numerals therewith and description thereof will be omitted.

Referring to FIG. 6A, light emitted by the light source 101 is incident on the polarized beam splitter 103 at a large incident angle (for example, 70 degrees) and is split into a P-polarized light beam $P_1$ which is transmitted through the polarized beam splitter 103 and an S-polarized light beam $S_1$ which is reflected by the polarized beam splitter 103. The P-polarized light beam $P_1$ is directed upward by a mirror 109a toward the synthesizing prism 106 provided perpendicular to the paper. At this point, polarization direction of the P-polarized light beam $P_1$ is rotated at angle θ. As a result, the P-polarized light beam $P_1$ is changed to a polarized light beam $P'_1$. The polarized light beam $P'_1$ having such a polarization direction is incident on the prism array 106A of the synthesizing prism 106 at an incident angle of +60°, namely, perpendicularly to the inclined face of the prism on which the light beam is incident.

The S-polarized light beam $S_1$ is transmitted through the half wave plate 104 to have the polarization direction thereof rotated at 90 degrees to become a P-polarized light beam $P_2$. The light beam is then directed upward by a mirror 109b toward the synthesizing prism 106. At this point, polarization direction of the P-polarized light beam $P_2$ is rotated at angle θ. As a result, the P-polarized light beam $P_2$ is changed to the polarized light beam $P'_2$. The light beam $P'_2$ having such a polarization direction is incident perpendicular to an inclined face of the prism of the prism array 106A.

The two light beams incident on the prism array 106A of the synthesizing prism 106 are totally reflected by inclined faces of the prism opposed to the faces on which the two light beams are incident and exit the prism from the surface 106B opposite to the surface having the prism array 106A. The outgoing light in which the two light beams are synthesized is guided to the liquid crystal panel section. The liquid crystal panel section includes a liquid crystal panel 112 and polarizing plates 111 and 113 interposing the liquid crystal panel 112.

In this example, the polarization direction conversion optical system and the liquid crystal panel section are located three-dimensionally. Due to such an arrangement, the LCD apparatus can be smaller than the one having the polarization direction conversion optical system and the liquid crystal panel section on the same plane, even with the polarized beam splitter 103 designed for a larger incident angle, which can be produced more easily and at lower cost.

Figure 7:
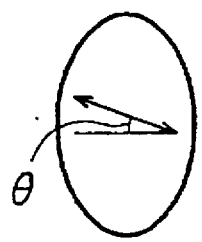
FIG. 7 illustrates a cross section of a synthesized light beam.

The light beam outgoing from the synthesizing prism 106, which includes the two light beams $P'_1$ and $P'_2$ from the different directions, has an ellipsoidal cross section as is shown in FIG. 7. The polarization direction of the synthesized light is at angle θ with respect to the minor axis of the ellipse. In accordance with this, the polarizing plates 111 and 113 are located so that the optic axes of the polarizing plates 111 and 113 will be parallel or perpendicular to the polarization direction of the outgoing light (for example, to the direction which is at angle θ with respect to the minor axis of the cross section of the outgoing light).

In the case where the outgoing light is transmitted through a half wave plate 110 to align the polarization direction of the outgoing light to the minor axis of the cross section of the outgoing light before the light is incident on the polarizing plate 111, the optic axes of the polarizing plates 111 and 113 need not be offset. In this case, conventional polarizing plates for allowing polarized light in the direction of the minor axis of the outgoing light beam having an ellipsoidal cross section (namely, the direction of the shorter side of the liquid crystal panel) can be used. Thus, rise in the production cost can be restricted.

Figure 8A:
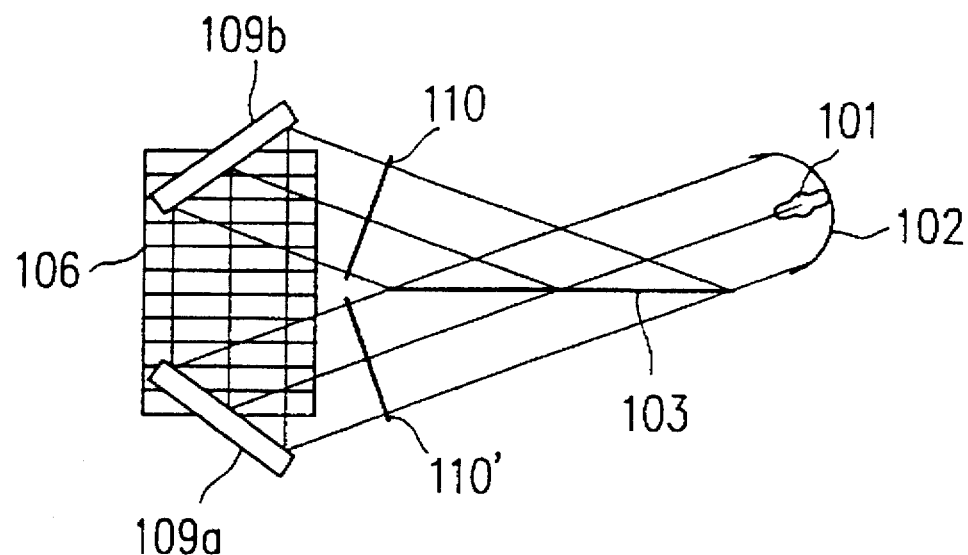
FIGS. 8A and 8B show an arrangement of an LCD apparatus in a modification of the third example.
Figure 8B:
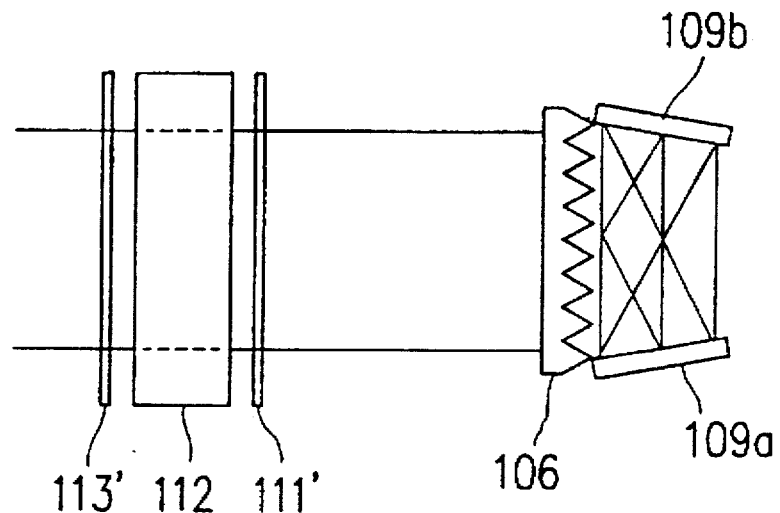

In FIGS. 8A and 8B, a λ/2 plate (a half wave plate) 110' is provided between the polarized beam splitter 103 and the mirror 109a, and another λ/2 plate 110 is provided between the polarized beam splitter 103 and the mirror 109b. In such a structure, the polarization direction of each light beam incident on the synthesizing prism 106 is rotated so that the polarization direction of the synthesized light will be aligned to the direction of the minor axis thereof. In this case, the light reflected by the polarized beam splitter 103 is transmitted through the polarizing plate only once. Thus, the reduction in the intensity of the light caused by transmission through the polarizing plate, which increases the light utilization efficiency.

In the first through third examples, mirror-type polarized beam splitters are used, but prism-type polarized beam splitters can be used instead. As the optical device for rotating the polarization direction of the light, a twisted nematic liquid crystal device including a 90°-twisted nematic liquid crystal material can be used instead of the half wave plate. The outgoing light can be aligned to the S-polarized light beam or the P-polarized light beam. The same effects can be obtained.

As has been described above, in the first through the third examples, white light having various polarization directions emitted from the light source is split by a polarized beam splitter into two linearly polarized light beams having different polarization directions. One of the split light beams is transmitted through the half wave plate so that the polarization directions of the two split light beams are aligned into one polarization direction, and then two light beams are synthesized by the synthesizing prism without using light refraction. Thus, the light outgoing from the synthesizing prism has a single polarization direction. The synthesizing of the light beams is not influenced by the refractive index or wavelength, which depend on the material of the synthesizing prism. Accordingly, the resultant light has no chromatic aberration which is caused by difference in refractive indices due to a difference in wavelengths.

In the case where the polarization direction conversion optical system and the liquid crystal panel section are provided three-dimensionally, the size of the whole LCD apparatus can be sufficiently small even with a polarized beam splitter designed for a relatively large incident angle, which is produced easily and at low cost.

The two light beams obtained by the polarized beam splitter exit the synthesizing prism in the state of being synthesized into one. Such synthesized light has a high luminance with restricted expansion.

Due to a plurality of prisms forming the synthesizing prism arranged continuously in a line, the outgoing light beam has an ellipsoidal cross section having a major axis which is approximately twice as long as a minor axis, whereas each light beam incident on the synthesizing prism has a circular cross section. In a projection-type liquid crystal TV usually has a screen which is longer in the horizontal direction than in the vertical direction, such a light beam having an ellipsoidal cross section is utilized at a higher efficiency than a light beam having a circular cross section for forming an image.

EXAMPLE 4

An optical device for converting the unpolarized light into linearly polarized light can be a holographic optical element. The holographic optical element can be produced relatively easily to have uniform performance for splitting the light by a method which is generally used in the fabrication of ICs. Accordingly, such reduction in the conversion efficiency as caused by non-uniform light splitting plane in the case of a conventional polarized beam splitter does not occur. In consequence, the liquid crystal panel can be irradiated at an increased efficiently, thus raising the luminance.

FIG. 9 is a schematic view of an LCD apparatus in a fourth example according to the present invention. The LCD apparatus includes a light source 201, a polarization direction conversion optical system 202, and a liquid crystal panel 203. The polarization direction conversion optical system 202 includes a first prism sheet 205, a second prism sheet 212, a hologram block 209 having a first holographic optical element 210 and a second holographic optical element 211, and a mirror 213, and a polarization direction rotation device 229 as polarization aligning means. As the polarization direction rotation device 229, a λ/2 plate is used. The hologram block 209 is a glass block having opposed surfaces on which the first and the second holographic optical elements 210 and 211 are formed. The hologram block 209 is disposed so that the holographic optical elements are opposed to the first prism sheet 205 and the second prism sheet 212, respectively.

Figure 10:
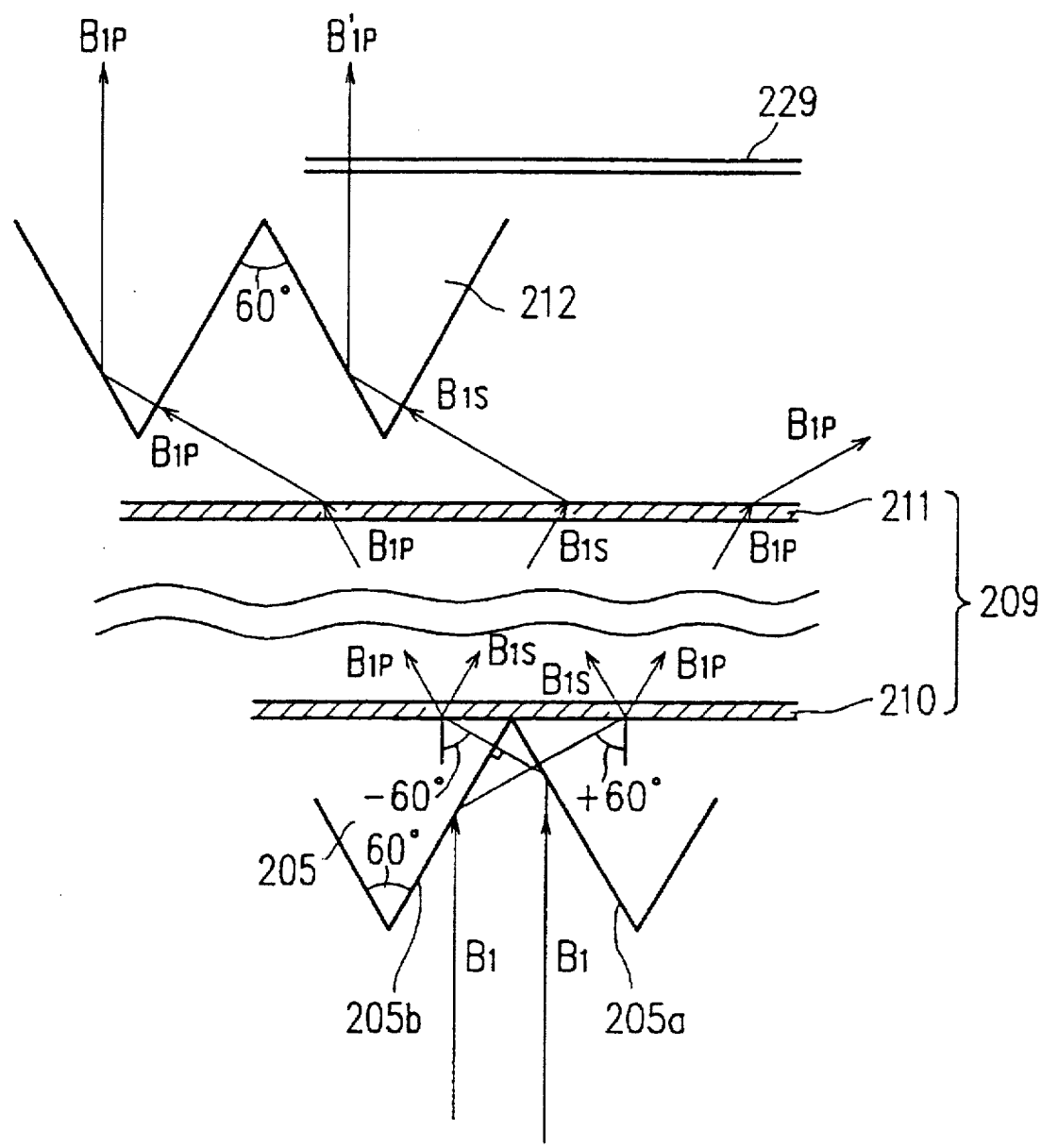
FIG. 10 is a partial enlarged view of the polarization direction conversion optical system in the LCD apparatus shown in FIG. 9.

FIG. 10 is a partial enlarged view of the polarization direction conversion optical system 202. The operation of the polarization direction conversion optical system 202 will be described with reference to FIGS. 9 and 10.

The first prism sheet 205 has a plurality of prisms arranged in one dimensional array, each having an apex set at 60 degrees. The travelling direction of outgoing light beams $B_1$ from a light source 201 is changed by inclined faces 205a and 205b of the prism. Then, the light beams $B_1$ are incident on the hologram block 209 at angles of +60° and −60°, respectively. Such incident angles are selected because the diffraction efficiency is generally satisfactory in the holographic optical elements using such angles.

Each light beam $B_1$ is split by the first holographic optical element 210 into a P-polarized light beam $B_{1P}$ and an S-polarized light beam $B_{1S}$. The P-polarized light beam $B_{1P}$ is transmitted through the first holographic optical element 210. The S-polarized light beam $B_{1S}$ is diffracted into the first order, i.e., is diffracted in such a manner that the intensity of the first order diffracted beams is the greatest. The light incident on the hologram block 209 is propagated at a different angle from the incident angle (±60 degrees) in accordance with the refraction index of the glass.

The P-polarized light beam $B_{1P}$ transmitted through the first holographic optical element 210 and the S-polarized light beam $B_{1S}$ are incident on the second holographic optical element 211. The P-polarized light beam $B_{1P}$ is transmitted through the second holographic optical element 211, and the S-polarized light beam $B_{1S}$ is again diffracted into the first order. Then, the P-polarized light beam $B_{1P}$ and the S-polarized light beam $B_{1S}$ exit the hologram block 209. A light component among the P-polarized light beam $B_{1P}$ which travels outward from an end area of the second holographic optical element 211 is totally reflected by a mirror 213 (FIG. 9). The rest of the P-polarized light beam $B_{1P}$ travels to be incident on the second prism sheet 212. The second prism sheet 212 includes a plurality of prisms arranged in one dimensional array, each having an apex set at 60 degrees. The P-polarized light beam $B_{1P}$ is substantially collimated by the second prism sheet 212 and exits.

The S-polarized light beam $B_{1S}$ exiting the hologram block 209 has the polarization plane thereof rotated at 90 degrees by the λ/2 plate 229 to become the P-polarized light beam $B'_{1P}$ and exits the polarization direction conversion optical system 202 together with the P-polarized light beam $B_{1P}$. The liquid crystal panel 203 is irradiated by the synthesized light of the P-polarized light beams $B'_{1P}$ and $B_{1P}$.

Although the λ/2 plate 229 is located closer to the liquid crystal panel 203 than the second prism sheet 212 in FIG. 9, the second prism sheet 212 can be located closer to the liquid crystal panel 203 than the λ/2 plate 229.

Figure 11A:
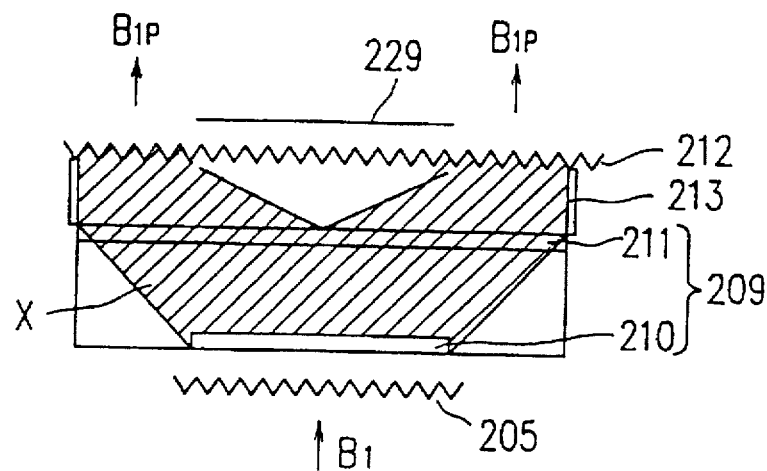
FIG. 11A is a view showing area where a P-polarized light beam can travel in the polarization direction conversion optical system shown in FIG. 10.
Figure 11B:
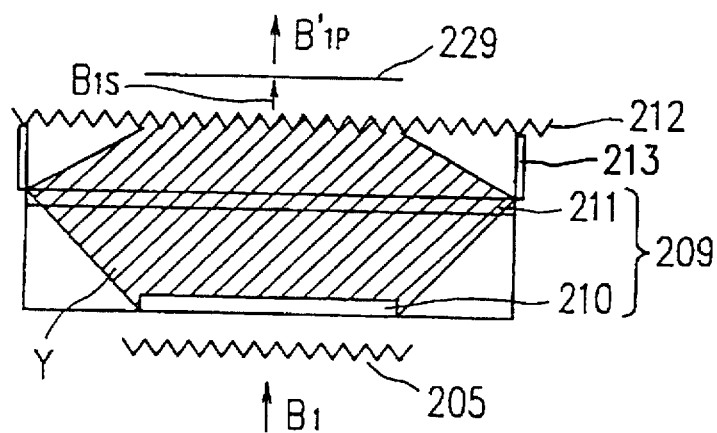
FIG. 11B is a view showing area where an S-polarized light beam can travel in the polarization direction conversion optical system shown in FIG. 10.

FIG. 11A is a view showing area X where the P-polarized light beam $B_{1P}$ can propagate in the polarization direction conversion optical system 202 shown in FIG. 10. FIG. 11B is a view showing area Y where the S-polarized light beam $B_{1S}$ can propagate in the polarization direction conversion optical system 202 shown in FIG. 10. As is appreciated from FIGS. 11A and 11B, an area on which the P-polarized light beam $B_{1P}$ is incident and an area on which the S-polarized light beam $B_{1S}$ is incident are separated from each other completely on the second prism sheet 212. The P-polarized light beam $B_{1P}$ is incident on an end part of the second prism sheet 212, and the S-polarized light beam $B_{1S}$ is incident on a central part of the second prism sheet 212. Accordingly, only the polarization direction of the S-polarized light beam $B_{1S}$ can be rotated at 90 degrees by the λ/2 plate 229 located opposed to the central part of the second prism sheet 212 to align the polarization direction of the outgoing light.

Figure 40:
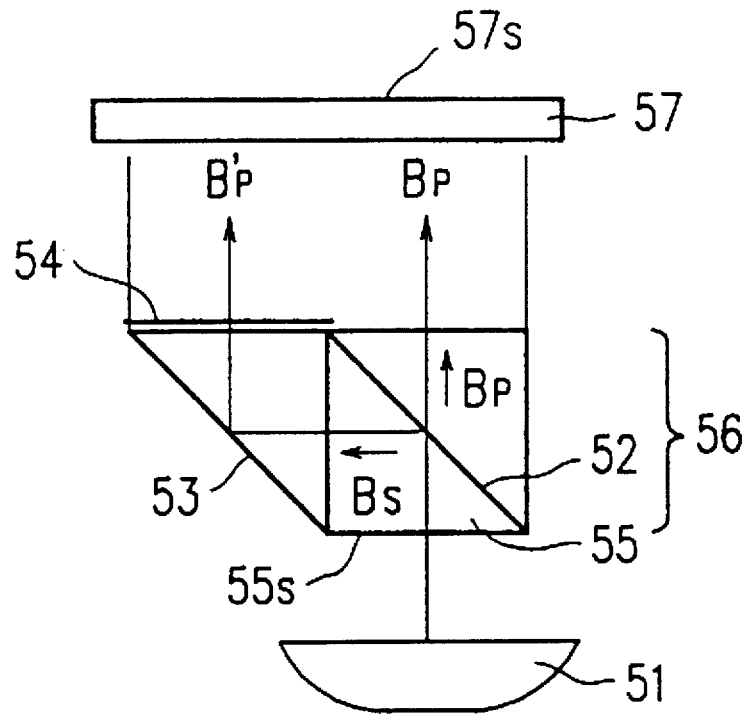
FIG. 40 is a plan view of a conventional LCD apparatus.

As described above, the polarization direction of the light emitted from the light source 201 is converted by the first holographic optical element 210 and the second holographic optical element 211 in this example. The holographic optical elements 210 and 211 can be relatively easily and uniformly produced by forming a hologram grating on two surfaces of a glass plate by a method which is generally used in fabrication of ICs. Such a conversion method solves the reduction in the conversion efficiency caused by a uniform polarization direction separation plane, which is a problem in the conventional polarization direction conversion optical system using the beam splitter shown in FIG. 40. As a result, the liquid crystal panel 203 is irradiated at a higher efficiency, thus improving the luminance of the LCD apparatus.

Figure 12:
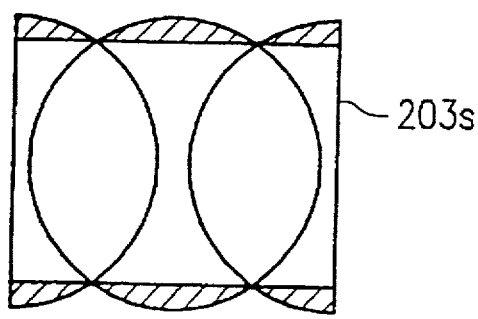
FIG. 12 shows a shape of the incident light on a liquid crystal panel in the LCD apparatus shown in FIG. 9.
Figure 41:
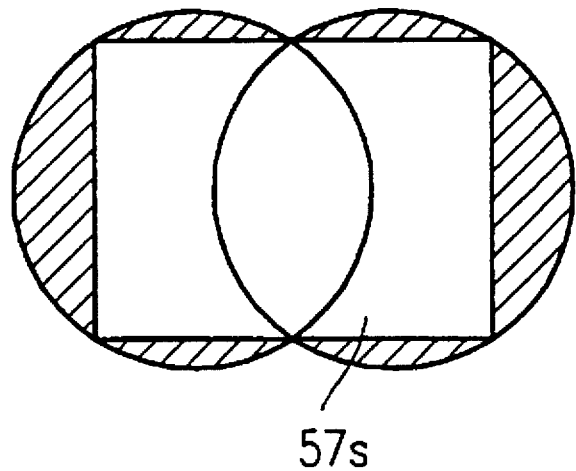
FIG. 41 shows a shape of a light beam outgoing from a polarization conversion optical system in the LCD apparatus shown in FIG. 40.

By the polarization direction conversion optical system 202 in this example, the beam has a shape shown in FIG. 12 on a display screen 203s of the liquid crystal panel 203. The incident light is used substantially with no waste, as compared with the beam shape shown in FIG. 41 on the display screen of the conventional liquid crystal panel. Accordingly, the light utilization efficiency is higher in the LCD apparatus of this example than in the conventional LCD apparatus.

The light from the light source 201 is totally aligned to the P-polarized light beam by the polarization direction conversion optical system 202, but can be aligned to the S-polarized light beam by changing the position of the λ/2 plate 229.

Figure 13:
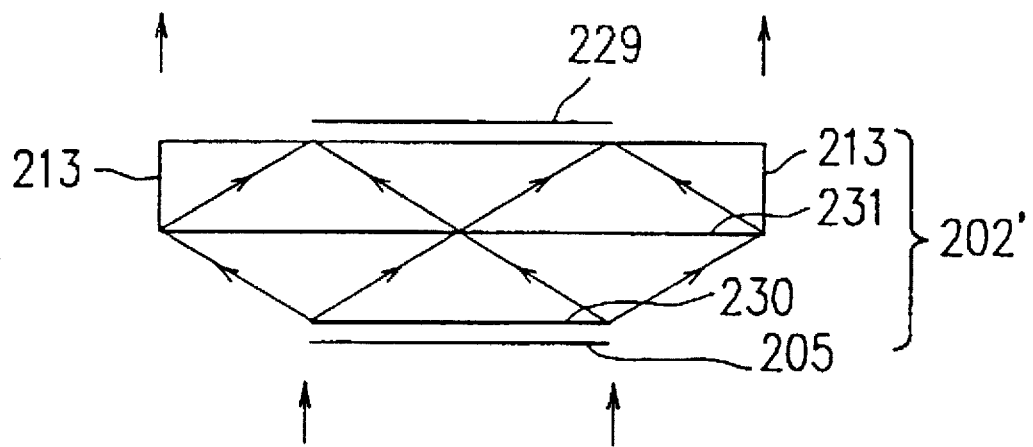
FIG. 13 is a schematic view of a polarization direction conversion optical system in a modification of the fourth example.

FIG. 13 is a schematic view of a polarization direction conversion optical system 202', in a modification of the fourth example. The polarization direction conversion optical system 202' includes a first hologram plate 230 having the first holographic optical element formed on one surface thereof and a second hologram plate 231 having the second holographic optical element formed on one surface thereof, instead of the hologram block 209 shown in FIG. 9. Accordingly, the increase in the thickness of the polarization direction conversion optical system due to the refractive index of glass can be restricted more than in the structure shown in FIG. 9. In detail, where the incident angle is ±60 degrees, the thickness in the polarization direction conversion optical system 202' can be reduced to $\sqrt{2/3}$ times the thickness of the polarization direction conversion optical system in the conventional LCD apparatus shown in FIG. 40.

Figure 14:
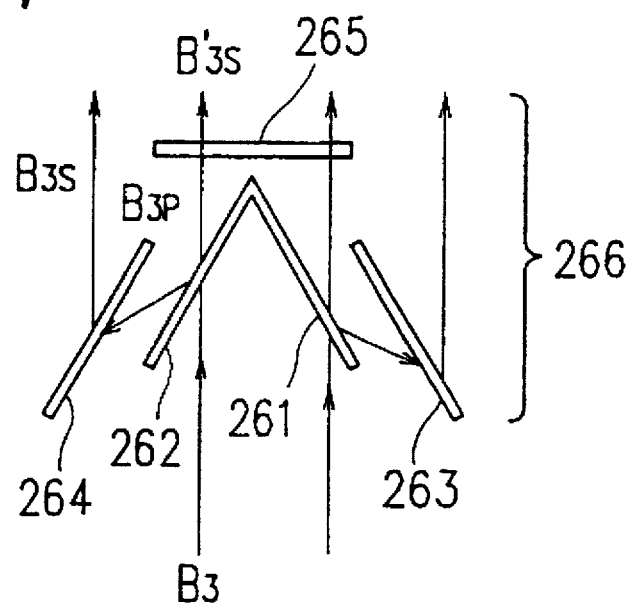
FIG. 14 is a schematic view of a polarization direction conversion optical system in another modification of the fourth example.

FIG. 14 is a schematic view of a polarization direction conversion optical system 266 in another modification of the fourth example. The polarization direction conversion optical system 266 includes hologram plates 261, 262, 263 and 264 and a λ/2 plate 265. The hologram plates 261 and 262 are arranged so that the light $B_3$ from the light source is incident thereon at an angle of ±60 degrees and the incident light $B_3$ is split into a P-polarized light beam $B_{3P}$ and an S-polarized light beam $B_{3S}$. The P-polarized light beam $B_{3P}$ travels straight and has the polarization plane thereof rotated at 90 degrees by the λ/2 plate 265 so as to be an S-polarized light beam $B'_{3S}$ to be emitted from the polarization direction conversion optical system 266. After the hologram plates 261 and 262 performs first-order diffraction of the S-polarized light beam $B_{3S}$, the S-polarized light beam $B_{3S}$ is incident on the hologram plates 263 and 264 for further first-order diffraction. Then, the resultant light is emitted from the polarization direction conversion optical system 266.

In the polarization direction conversion optical system 266 also, the unpolarized light from the light source can be converted into linear polarization having a uniform polarization plane and incident on the liquid crystal panel at a satisfactory efficiency as in the polarization direction conversion optical systems 202 and 202'. The polarization direction conversion optical system 266 is thicker than the conventional polarization direction conversion optical system.

The polarization direction conversion optical system can have other structures as long as the polarization direction of the incident light can be aligned by a holographic optical element.

In the above examples, the incident angle of the light on the holographic optical element is 60 degrees. The present invention is applicable to other incident angles. Further, the polarization direction conversion optical systems 202 and 202' in FIG. 9 can be thinner by setting the incident angle thereof larger. In such a case, the shape of the holographic optical element needs to be adjusted in accordance with the incident angle of light so that the diffraction efficiency of the S-polarized light beam and the transmission efficiency of the P-polarized light beam with respect to such an incident angle are at a satisfactory level.

Hereinafter, practical examples of the shape of the holographic optical element where the incident angle is 60 degrees will be described.

Figure 15A:
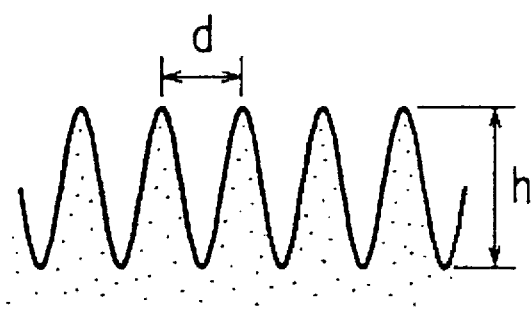
FIGS. 15A and 15B show examples of a shape of a holographic optical element.
Figure 15B:
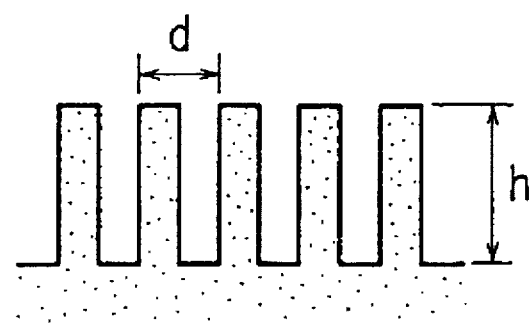

The holographic optical element can be sine wave-like as is shown in FIG. 15A or rectangular wave-shaped as is shown in FIG. 15B. In FIGS. 15A and 15B, letter d indicates the pitch, and letter h indicates the depth.

First, a holographic optical element having the sine wave-like shape shown in FIG. 15A will be described.

Figure 16A:
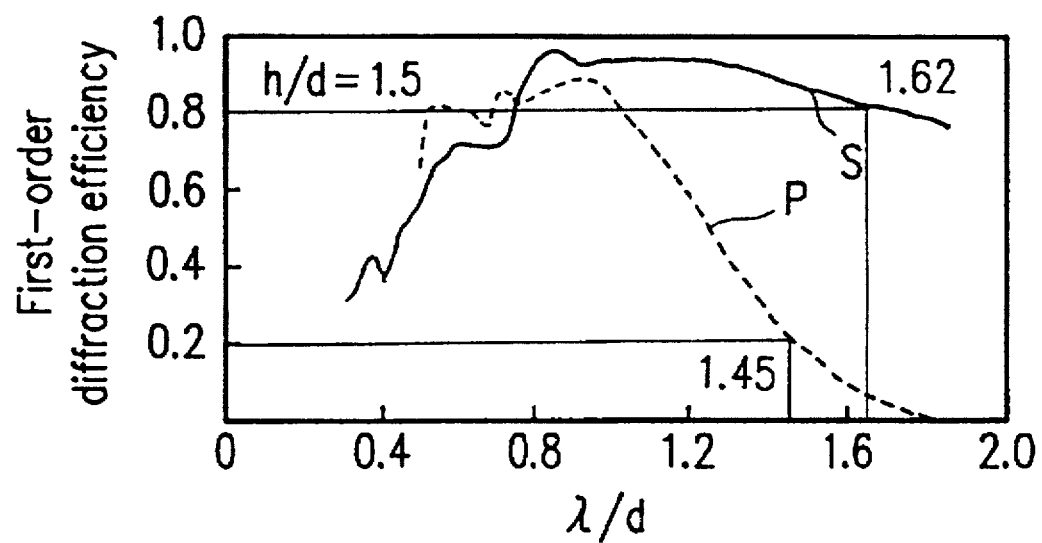
FIGS. 16A and 16B are graphs showing the diffraction characteristics of the holographic optical element shown in FIG. 15A.
Figure 16B:
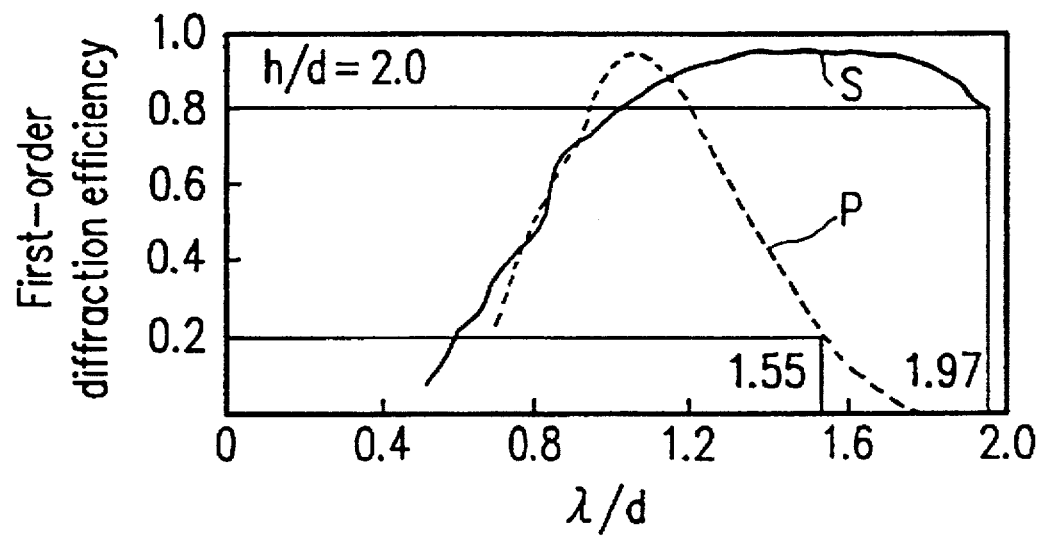

FIGS. 16A and 16B are graphs illustrating the results of numerical calculation of the diffraction characteristics of the holographic optical element shown in FIG. 15A. The refractive index of the holographic optical element n=1.66, and the Bragg's incident angle $\theta_B = \sin^{-1}$ (λ/2d). The vertical axis indicates the first-order diffraction efficiency, and the horizontal axis indicates λ/d. FIG. 16A shows the results when h/d=1.5, and FIG. 16B shows the results when h/d=2.0.

From FIGS. 16A and 16B, it is appreciated that the diffraction efficiency of a P-polarized light beam becomes lower than that of an S-polarized light beam where λ/d =1.0 to 1.2 or more, so that the P-polarized light beam and the S-polarized light beam can be separated from each other. Where h/d=1.5, the diffraction efficiency of the S-polarized light beam is 80% or more and the diffraction efficiency of the P-polarized light beam is 20% or less (transmission efficiency =80% or more) where 1.45<λ/d<1.62. A holographic optical element having such ranges of efficiencies is preferably used for the polarization direction conversion optical system according to the present invention. Where h/d=2.0, the above-mentioned characteristics are obtained where 1.55<λ/d<1.97.

Next, a holographic optical element having the sine wave-like shape shown in FIG. 15B will be described.

Figure 17A:
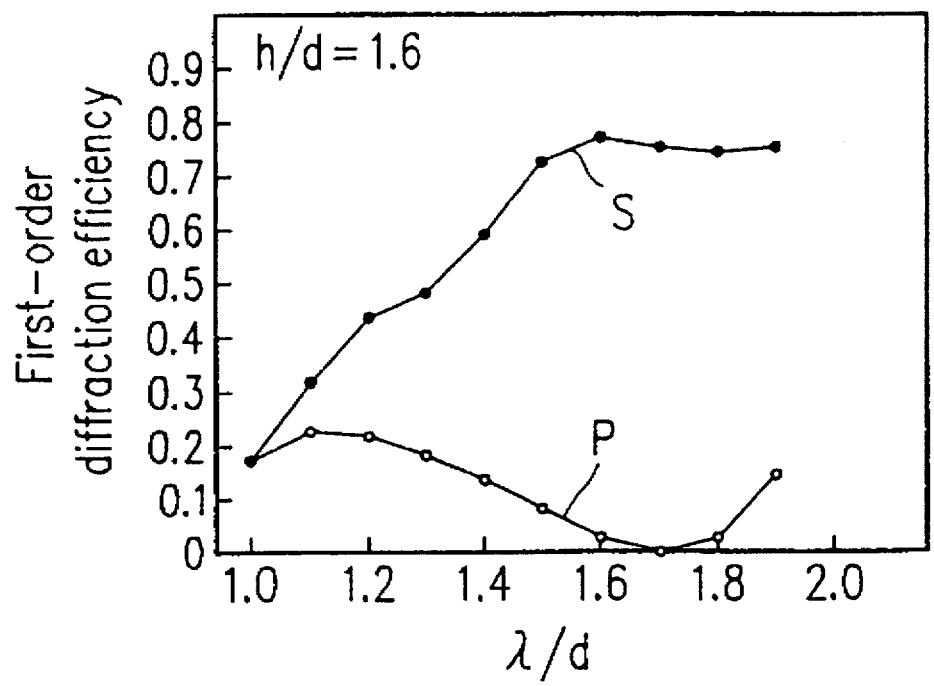
FIGS. 17A and 17B are graphs showing the diffraction characteristics of the holographic optical element shown in FIG. 15B.
Figure 17B:
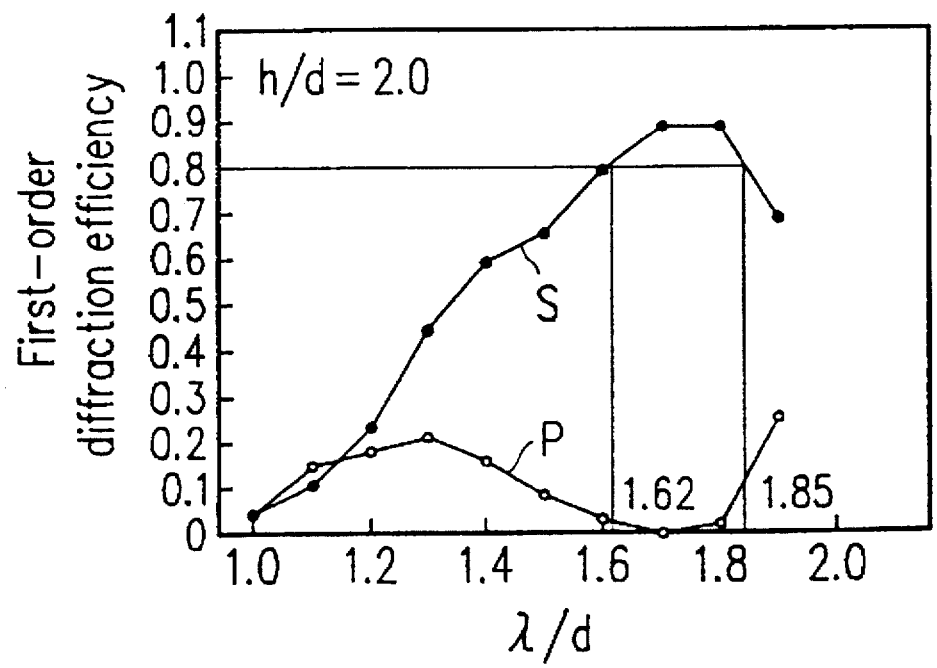

FIGS. 17A and 17B are graphs illustrating the results of numerical calculation of the diffraction characteristics of the holographic optical element shown in FIG. 15B. The vertical axis indicates the first-order diffraction efficiency of light incident at an angle of 60 degrees, and the horizontal axis indicates λ/d. FIG. 17A shows the results when h/d=1.6, and FIG. 17B shows the results when h/d=2.0.

From FIGS. 17A and 17B, it is appreciated that the diffraction efficiency of the S-polarized light beam is 80% or more and the diffraction efficiency of the P-polarized light beam is 20% or less (transmission efficiency=80% or more) where 1.62<λ/d<1.85 when h/d=2.0. A holographic optical element having such ranges of efficiencies is preferably used for the polarization direction conversion optical system according to the present invention.

In the holographic optical element shown in FIG. 15B, satisfactory diffraction efficiency is obtained where the incident angle is 60 degrees, h/d=2.0, and λ/d=1.62 to 1.85. However, it is difficult to diffract light in the entire range of visible light with such conditions. Accordingly, when the holographic optical element shown in FIG. 15B is used, three types of holographic optical elements corresponding to red light (R; 650 nm), green light (G; 550 nm) and blue light (B; 450 nm) are used.

In detail, a holographic optical element for red (r) having a pitch d=0.373 μm and a depth h=0.746 μm, a holographic optical element for green (g) having a pitch d=0.318 μm and a depth h=0.636 μm, and a holographic optical element for blue (b) having a pitch d=0.259 μm and a depth h=0.518 μm can be used. The diffraction efficiency of 80% or more for the S-polarized light beam and the diffraction efficiency of 20% or less (transmission efficiency of 80% or more) for the P-polarized light beam are obtained where λ=605 nm to 691 nm for the holographic optical element (r), λ=515 nm to 588 nm for the holographic optical element (g), and λ=420 nm to 480 nm for the holographic optical element (b). Under such conditions, the unpolarized light from the light source can be converted into linear polarization at a satisfactory efficiency.

When the holographic optical element shown in FIG. 15A is used also, it is preferable to use three types of holographic optical elements for the same reason as described above.

Figure 18:
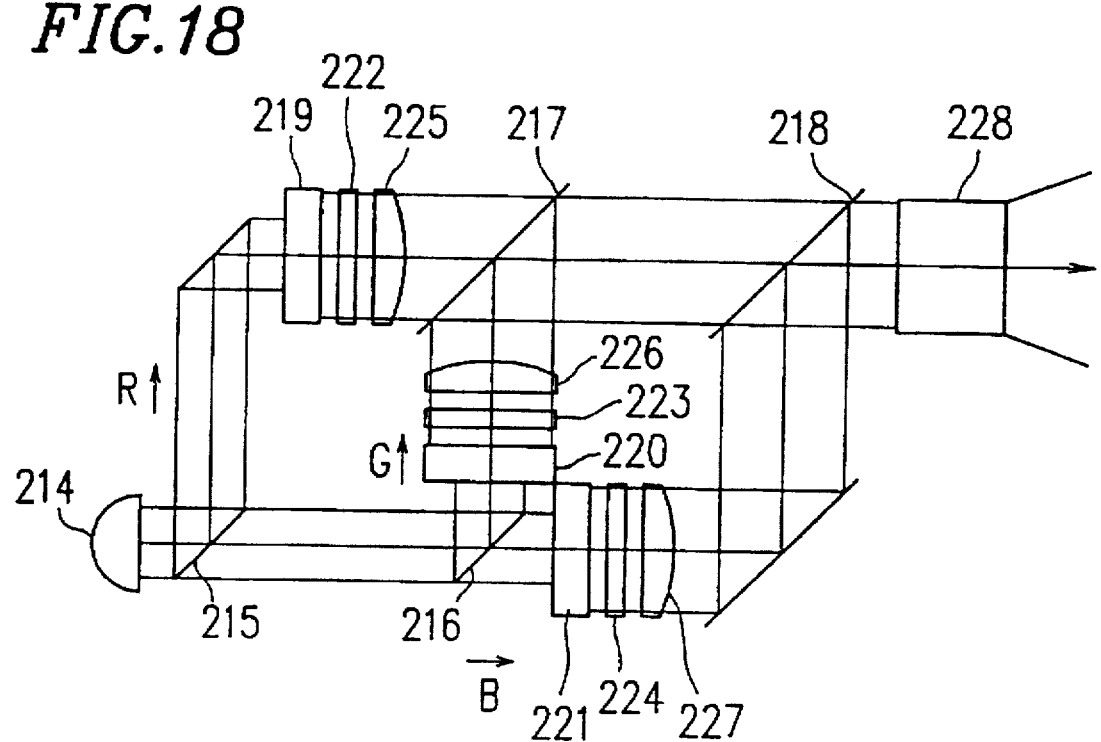
FIG. 18 is a schematic view of an LCD apparatus in a modification of the fourth example.

FIG. 18 is a liquid crystal panel apparatus in which the above-mentioned three holographic optical elements are used as each of the first holographic optical element 210 and the second holographic optical element 211 in the polarization direction conversion optical system 202 in FIG. 9.

In a polarization direction conversion optical system 219, the holographic optical element (r) is used as each of the first holographic optical element 210 and the second holographic optical element 211. In a polarization direction conversion optical system 220, the holographic optical element (g) is used as each of the first holographic optical element 210 and the second holographic optical element 211. In a polarization direction conversion optical system 221, the holographic optical element (b) is used as each of the first holographic optical element 210 and the second holographic optical element 211.

A red light component R of unpolarized light from a light source 214 is reflected by a first dichroic mirror 215 and then is linearly polarized by the polarization direction conversion optical system 219 having the holographic optical element (r) so as to have a single polarization direction. Then, a liquid crystal panel 222 is irradiated by the red light beam R, and the red light beam R is transmitted through a lens 225.

A green light beam G of the unpolarized light is transmitted through the first dichroic mirror 215 and is reflected by a second dichroic mirror 216. Then, the green light beam G is incident on the polarization direction conversion optical system 220 having the holographic optical element (g). After the polarization directions of the green light beam G are aligned in one direction by the system 220, the liquid crystal panel 223 is irradiated by the green light beam G. Then, the green light beam G is transmitted through the lens 226.

A blue light beam B is transmitted through the first dichroic mirror 215 and the second dichroic mirror 216, and is incident on the polarization direction conversion optical system 221 having the holographic optical element (b). After the polarization directions of the blue light beam B are aligned in one direction by the system 221, the liquid crystal panel 224 is irradiated by the blue light beam B. Then, the blue light beam B is transmitted through the lens 227.

The light beams transmitted through the lenses 225, 226 and 227 are synthesized by a fourth dichroic mirror 217 and a fifth dichroic mirror 218, and are projected on a screen through a projection lens 228.

In such a projection type LCD apparatus also, the unpolarized light from the light source 214 can be utilized at a satisfactory efficiency by the polarization direction conversion optical systems 219, 220 and 221. Thus, the luminance of the display screen can be improved. Since the thickness of the polarization direction conversion optical systems 219, 220 and 221 can be reduced, the size of the whole LCD apparatus can be reduced.

As described above, in an LCD apparatus in this example and the modifications thereof, the incident light is split into the P-polarized light beam and the S-polarized light beam, using a holographic optical element in the polarization direction conversion optical system. By such a system, the splitting of the light is performed uniformly. Accordingly, the light intensity which is supplied to the liquid crystal panel can be enhanced, thus to improve the luminance of the LCD apparatus. The polarization direction conversion optical system can be produced easily and at low cost. Since the thickness of the polarization direction conversion optical system can be reduced, the size of the whole LCD apparatus can be reduced.

EXAMPLE 5

An LCD apparatus in a fifth example according to the present invention will be described with reference to FIG. 19.

Figure 19:
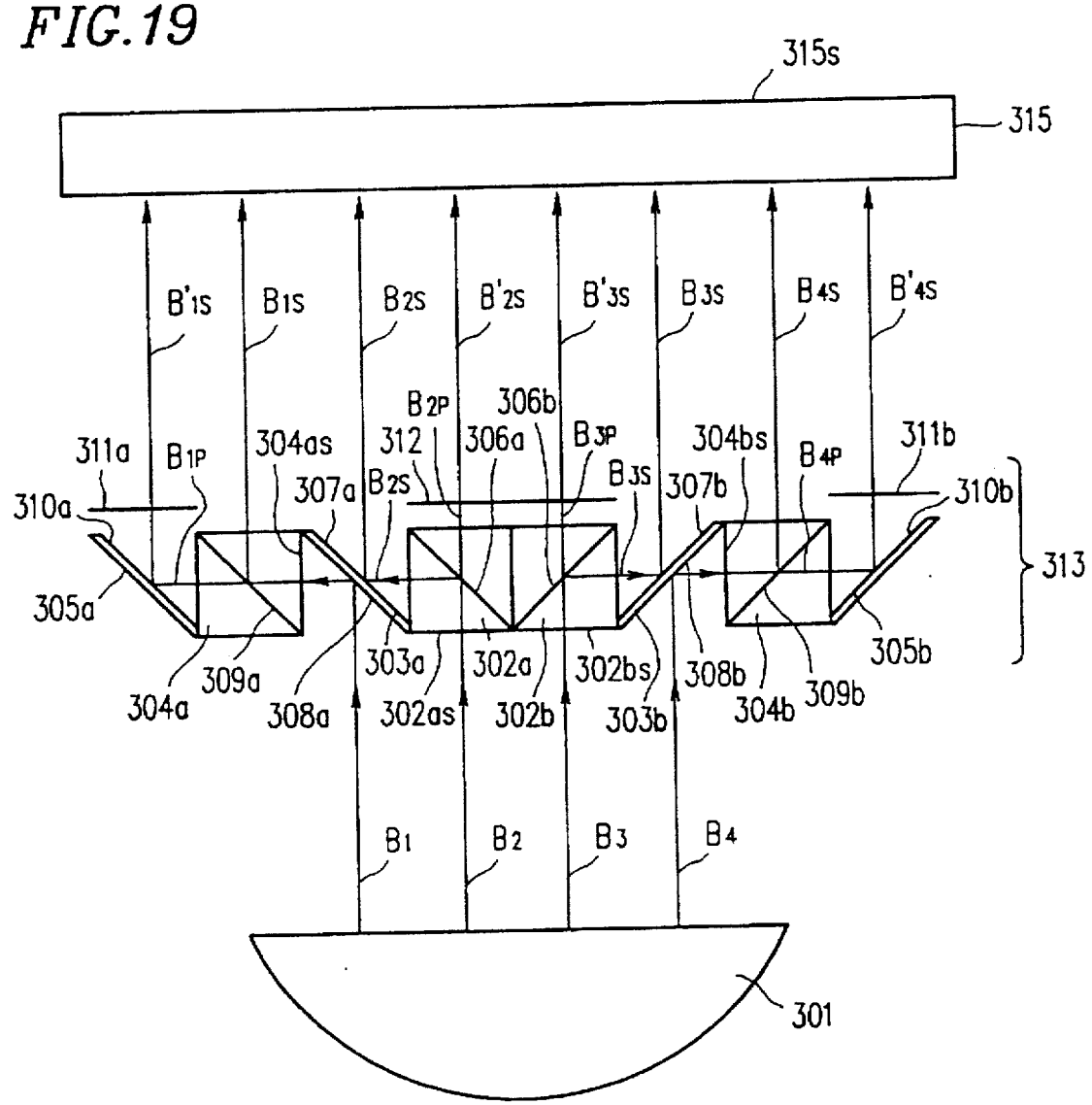
FIG. 19 is a schematic view of an LCD apparatus in the fifth example according to the present invention.

As shown in FIG. 19, the LCD apparatus in the present example includes a light source 301, a polarization direction conversion optical system 313, and a liquid crystal panel 315. The polarization direction conversion optical system 313 includes first prism-type polarized beam splitters 302a and 302b, mirrors 303a and 303b, and second prism-type polarized beam splitters 304a and 304b, mirrors 305a and 305b, and λ/2 plates 311a, 311b and 312. One surface of the mirror 303a acts as a first reflector 307a, and one surface of the mirror 303b acts as another first reflector 307b. The other surface of the mirror 303a acts as a second reflector 308a, and the other surface of the mirror 303b acts as another second reflector 308b. One surface of the mirror 305a acts as a third reflector 310a, and one surface of the mirror 305b acts as another third reflector 310b.

An unpolarized collimated light beam is split into four light beams $B_1$, $B_2$, $B_3$ and $B_4$ and incident on the mirror 303a, the first polarized beam splitters 302a and 302b, and the mirror 303b, respectively.

The light beam $B_2$ incident on the first polarized beam splitter 302a is split into a P-polarized light beam $B_{2P}$ transmitted through a splitting plane 306a and an S-polarized light beam $B_{2S}$ reflected by the splitting plane 306a. The light beam $B_3$ incident on the first polarized beam splitter 302b is split into a P-polarized light beam $B_{3P}$ transmitted through a splitting plane 306b and an S-polarized light beam $B_{3S}$ reflected by the splitting plane 306b. The P-polarized light beams $B_{2P}$ and $B_{3P}$ have the polarization planes thereof rotated at 90 degrees by the λ/2 plate 312 to become S-polarized light beams $B'_{2S}$ and $B'_{3S}$ and are emitted from the polarization direction conversion optical system 313. The S-polarized light beams $B_{2S}$ and $B_{3S}$ are reflected by the first reflectors 307a and 307b respectively and are emitted from the polarization direction conversion optical system 313.

The light beams $B_1$ and $B_4$ incident on the mirrors 303a and 303b are respectively reflected by the second reflectors 308a and 308b to be incident on the second polarized beam splitter 304a and 304b. Then, the light beam $B_1$ is split into a P-polarized light beam $B_{1P}$ transmitted through a splitting plane 309a and an S-polarized light beam $B_{1S}$ reflected by the splitting plane 309a. The light beam $B_4$ is split into a P-polarized light beam $B_{4P}$ transmitted through a splitting plane 309b and an S-polarized light beam $B_{4S}$ reflected by the splitting plane 309b. The S-polarized light beams $B_{1S}$ and $B_{4S}$ are emitted from the polarization direction conversion optical system 313. The P-polarized light beams $B_{1P}$ and $B_{4P}$ are respectively incident on the mirrors 305a and 305b to be reflected by the third reflectors 310a and 310b. Then, the P-polarized light beams $B_{1P}$ and $B_{4P}$ respectively have the polarization planes thereof rotated by the λ/2 plates 311a and 311b at 90 degrees to become S-polarized light beams $B'_{1S}$ and $B'_{4S}$ and are emitted from the polarization direction conversion optical system 313.

In this manner, the unpolarized light $B_1$, $B_2$, $B_3$ and $B_4$ are all aligned to be the S-polarized light beams and then are emitted from the polarization direction conversion optical system 313. The liquid crystal panel is irradiated by such aligned light for displaying an image.

In the polarization direction conversion optical system 313, the area of each of light incident planes 302as, 302bs, 304as and 304bs of the first polarized beam splitters 302a and 302b and the second polarized beam splitters 304a and 304b, respectively, can be as small as approximately ⅛ of the area of the display screen 315s of the liquid crystal panel 315. Thus, the area of each of the light splitting planes 306a, 306b, 309a and 309b can be approximately ½ of the area of the light splitting plane of the conventional LCD apparatus shown in FIG. 42. Such small light splitting planes can easily have uniform light splitting performance. As a result, the polarization direction conversion efficiency is improved, and thus the light intensity which can be incident on the liquid crystal panel 315 can be increased.

Figure 42:
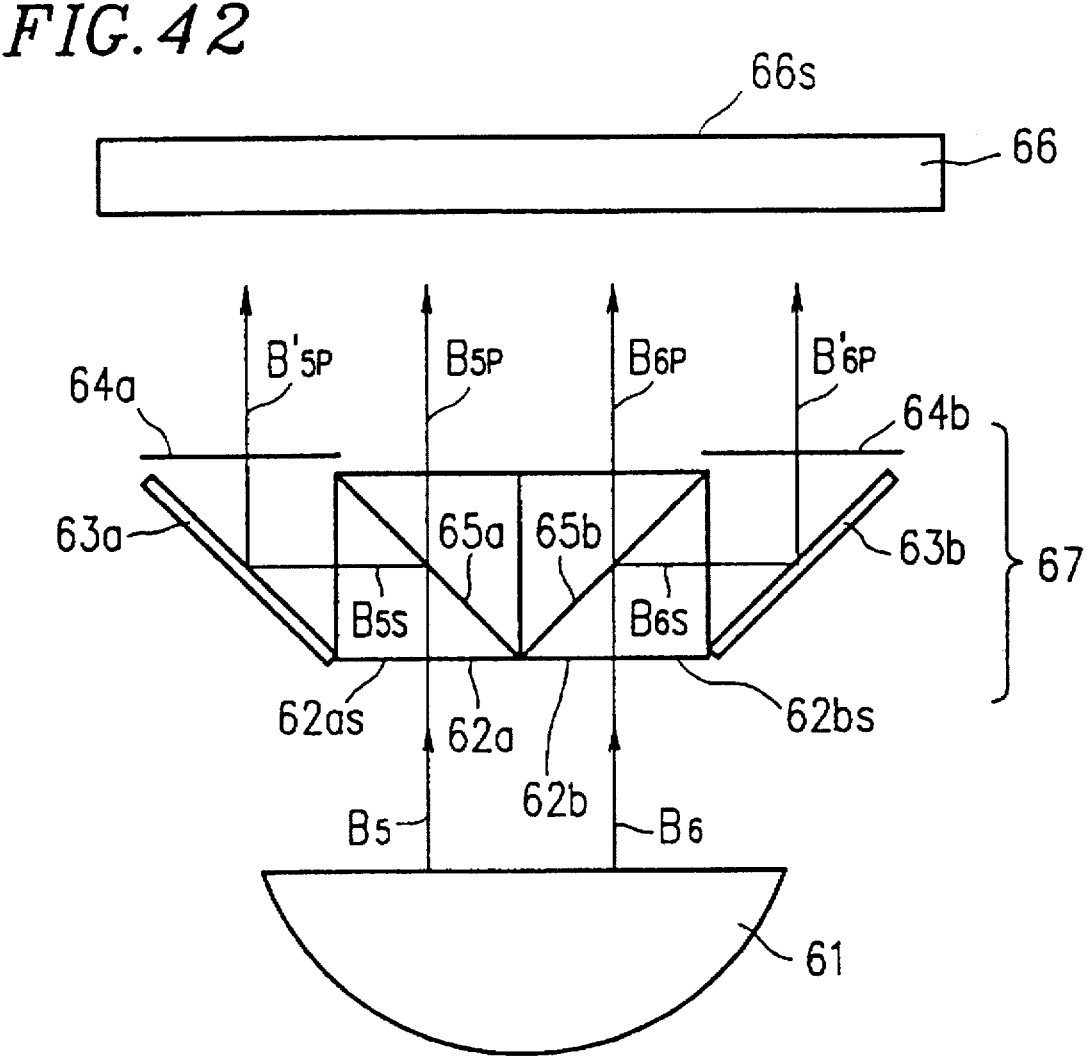
FIG. 42 is a plan view of another conventional LCD apparatus.
Figure 43:
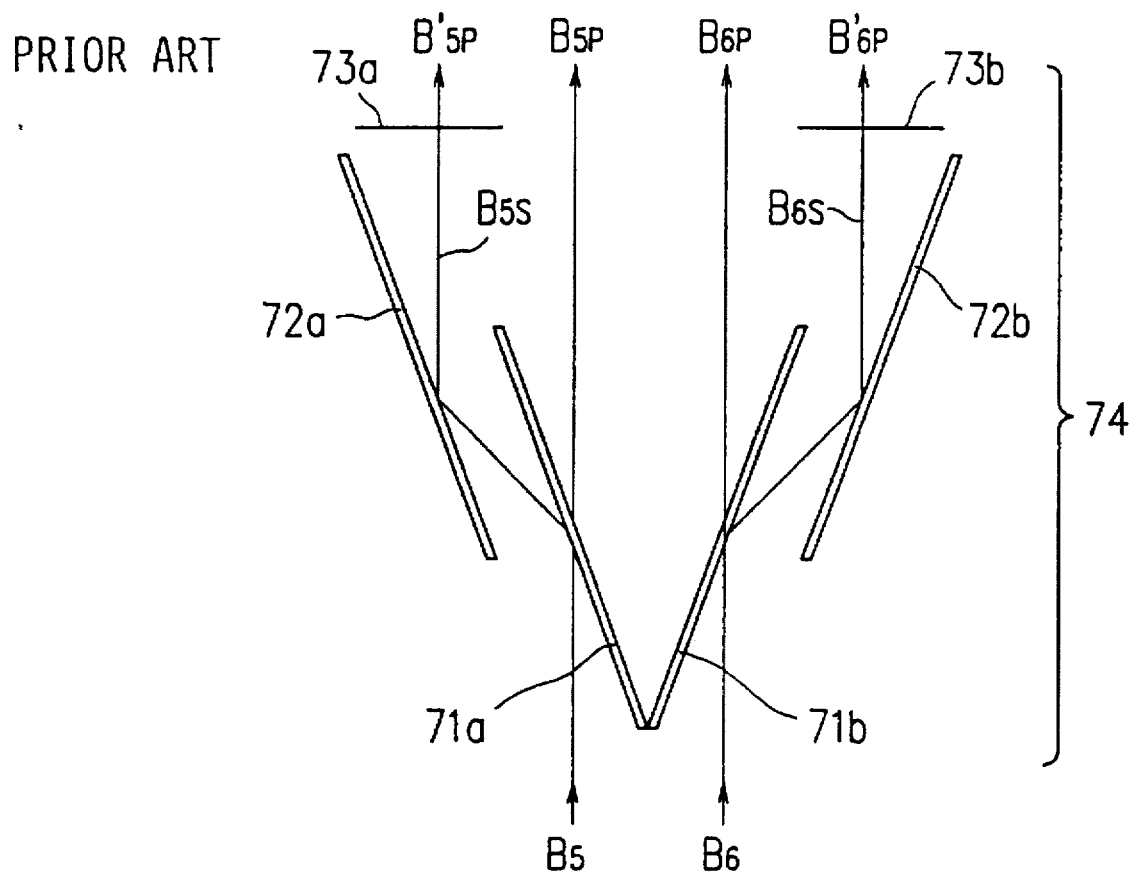
FIG. 43 is a plan view of still another conventional LCD apparatus.

The thickness of the polarization direction conversion optical system 313 is approximately half of the thickness of the polarization direction conversion optical system shown in FIG. 42. Thus, the size of the LCD apparatus can be reduced.

The total volume of the polarized beam splitters 302a, 302b, 304a and 304b is approximately half of the volume of the polarization direction conversion optical system shown in FIG. 42, and thus production cost thereof is reduced.

Figure 20:
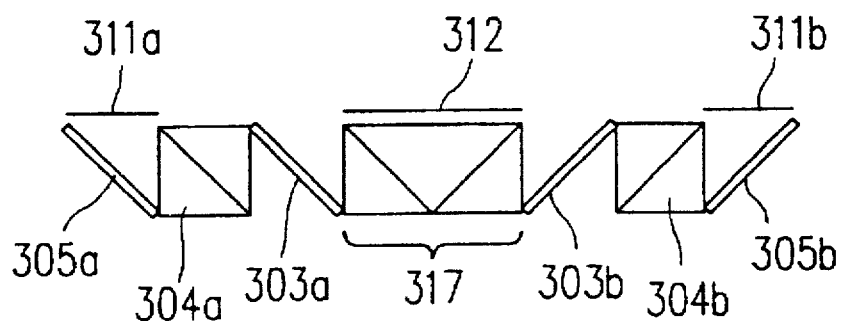
FIG. 20 shows a polarization direction conversion optical system in a modification of the fifth example.

FIG. 20 shows a polarization direction conversion optical system in a modification of the fifth example. The polarization direction conversion optical system in this modification includes a polarized beam splitter 317 formed by integrating the polarized beam splitters 302a and 302b. By use of such a polarized beam splitter, irregular reflection of light at the interface between the two polarized beam splitters is avoided, and thus the incident light can be utilized more effectively.

Figure 21A:
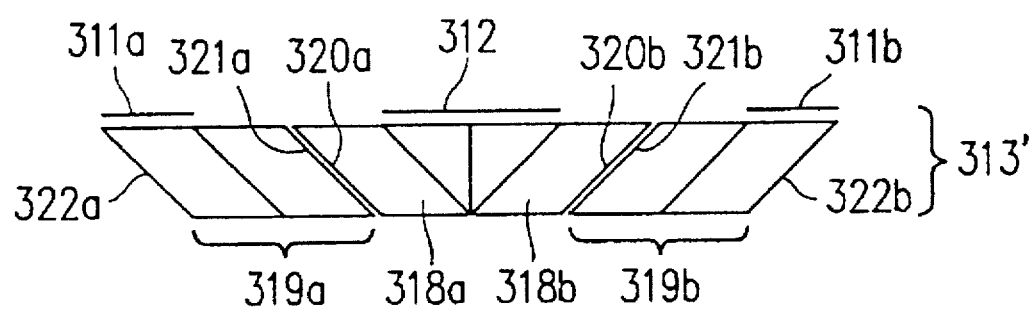
FIG. 21A shows a polarization direction conversion optical system in another modification of the fifth example.

FIG. 21A shows a polarization direction conversion optical system 313' in another modification of the fifth example. In this modification, the polarization direction conversion optical system 313' includes a prism device 318a formed by the first polarized beam splitter 302a and the first reflector 307a; a prism device 318b formed by the first polarized beam splitter 302b and the first reflector 307b; a prism device 319a formed by the second reflectors 308a, the second polarized beam splitter 304a and the third reflector 310a; and a prism device 319b formed by the second reflectors 308b, the second polarized beam splitter 304b and the third reflector 310b. A total reflection plane 320a of the prism device 318a and a total reflection plane 320b of the prism device 318b each act as a first reflector, and a total reflection plane 321a of the prism device 319a and a total reflection plane 321b of the prism device 319b each act as a second reflector. Another total reflection plane 322a of the prism device 319a and another total reflection plane 322b of the prism device 319b each act as a third reflector.

In the case where a mirror is used as a reflector as in FIG. 19, it is difficult for the reflector to have a reflectivity close to 100% because the mirror absorbs light. By contrast, in the case where a total reflection plane of a prism is used as a reflector as in FIG. 21A, a reflectivity of substantially 100% can be obtained. Accordingly, in the polarization direction conversion optical system 313', the incident light can be emitted toward the liquid crystal panel at an efficiency of almost 100%, thus to enhance the luminance of the LCD apparatus. Further, in the polarization direction conversion optical systems shown in FIGS. 20 and 21A, since the number of components is reduced, production cost can be lowered.

In the polarization direction conversion optical system 313', the prism devices 318a and 318b are preferably arranged to a slight distance away from the prism devices 319a and 319b so as to form thin air layers. Due to the difference in the refractive index between air and glass, the reflectors 320a, 320b, 321a and 321b can easily have a reflectivity of 100%.

Figure 21B:
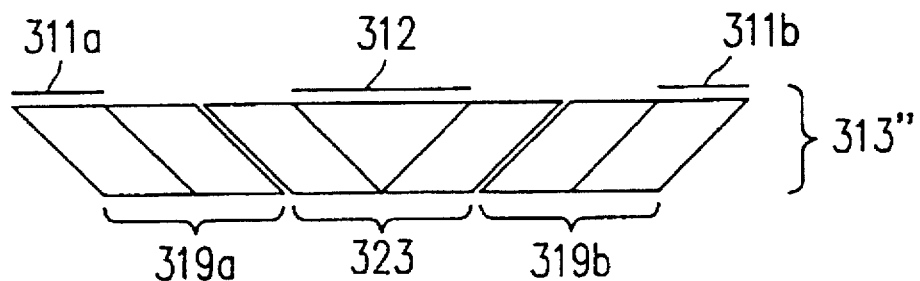
FIG. 21B shows a polarization direction conversion optical system in still another modification of the fifth example.

It is possible to integrate the prism devices 318a and 318b. FIG. 21B shows a polarization direction conversion optical system 313" including a prism device 323 formed by integrating the prism devices 318a and 318b.

Figure 22:
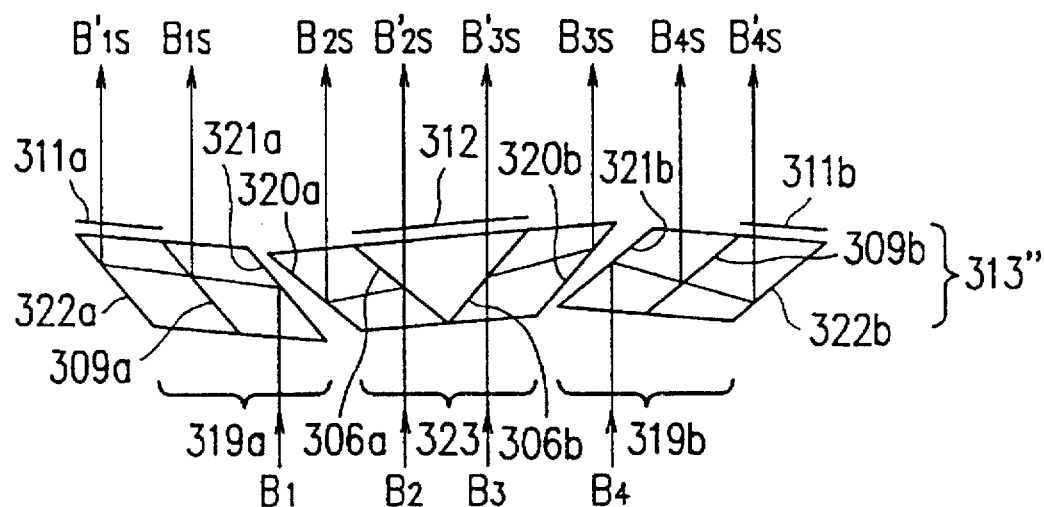
FIG. 22 shows the polarization direction conversion optical system shown in FIG. 21A where an assembly error occurs.

The travelling direction of the light emitted from the polarization direction conversion optical systems 313' and 313" is constant even when the positional relationship among the prism devices is deviated by the assembly error. FIG. 22 shows the polarization direction conversion optical system 313" where the positional relationship among the prism devices is deviated by the assembly error. The positional relationship between the light splitting plane 306a and the first reflector 320a, between the light splitting plane 306b and the first reflector 320b is not changed from the state shown in FIG. 21B. The positional relationship among the second reflector 321a, the light splitting planes 309a and the third reflector 322a and the positional relationship among the second reflector 321b, the light splitting planes 309b and the third reflector 322b, are not changed from the state shown in FIG. 21B. In such a structure the light beams $B'_{1S}$ through $B'_{4S}$ emitted from the polarization direction conversion optical system 313" travel in the same direction with the incident light beams $B_1$ through $B_4$. Accordingly, adjustment of the positional relationship among the components is not required during the assembly of the polarization direction conversion optical system 313". As a result, the polarization direction conversion optical system 313" can be produced more easily and at lower cost.

Figure 23:
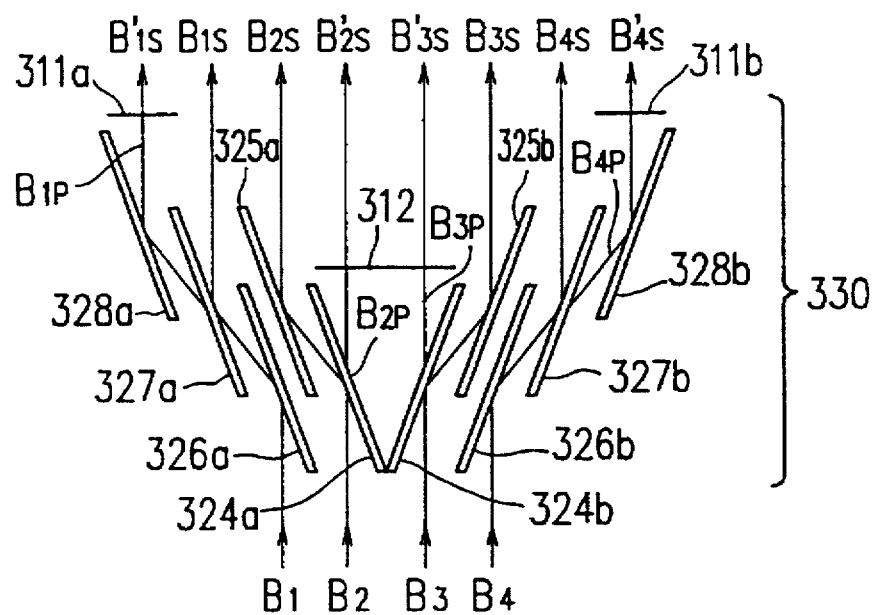
FIG. 23 shows a polarization direction conversion optical system in still another modification of the fifth example.

FIG. 23 shows a polarization direction conversion optical system 330 in still another modification of the fifth example. In the systems shown in FIGS. 19 through 22, the first polarized beam splitters and the second polarized beam splitters are of prism-type; whereas in the polarization direction conversion optical system 330 in FIG. 23, first polarized beam splitters 324a and 324b and second polarized beam splitters 327a and 327b are of plate-type, which can be produced relatively easily. The polarization direction conversion optical system 330 further includes mirrors 325a, 325b, 326a, 326b, 328a and 328b each having a reflector formed on one surface thereof.

Usually, a plate-type polarized beam splitter requires the light to be incident thereon at a relatively large angle. Thus, the polarization direction conversion optical system 330 is thicker than the polarization direction conversion optical system 313 shown in FIG. 19. However, the polarization direction conversion optical system 330 can be produced at a sufficiently low cost due to compactness of the polarized beam splitters 324a, 324b, 327a and 327b.

In the fifth example and the modifications thereof, the incident light is aligned to an S-polarized light beam. The incident light can be aligned to a P-polarized light beam by changing the position of the λ/2 plate.

As is described above, in an LCD apparatus in the fifth example, light from the light source is incident on two first polarized beam splitters and two second reflectors in the state of being split into four light beams and then substantially doubled laterally to be directed to the liquid crystal panel. Accordingly, the cross section of the light beam incident on the first polarized beam splitter is approximately half of the cross section of the light beam incident on the conventional polarized beam splitter. Thus, the area of each light splitting plane is approximately half of the area of a light splitting plane in the conventional polarization direction conversion optical system. Similarly, the area of each light splitting plane of the second polarized beam splitter for receiving the light reflected by the second reflector is approximately half of the area of such a plane in the conventional polarization direction conversion optical system. As a result, a light splitting plane having uniform light splitting performance can be more easily produced. For the same reason, the thickness of the polarization direction conversion optical system can be reduced, which contributes to the reduction of the thickness of the LCD apparatus.

By forming the first through third reflectors by using total reflecting planes of a prism, light is not absorbed by the first through third reflectors. As a result, the light utilization efficiency can be increased.

Even in the case where the positional relationship among the components of the polarization direction conversion optical system is deviated by an assembly error or the like, the positional relationship between the first polarized beam splitter and the first reflector remains the same, as does the positional relationship among the second reflector, the second polarized beam splitter and the third polarized beam splitter. Thus, the travelling direction of the light emitted from the polarization direction conversion optical system is constant.

EXAMPLE 6

A polarization direction conversion optical system in a sixth example is improved from the polarization direction conversion optical system in the first example to have a still higher light utilization efficiency.

First, the relationship between the shape of the light beam and the light utilization efficiency in the LCD apparatus in the first example will be described.

With reference to FIG. 1, the light emitted from the light source 101 is reflected by the paraboloidal mirror 102 to be incident on the polarized beam splitter 103. The shape of the light beam incident on the polarized beam splitter 103 is circular as is shown in FIG. 33A. In the light beam 114 (FIG. 2) from the synthesizing prism 106, a P-polarized light beam $P_1$ obtained by splitting the incident light by the polarized beam splitter 103 and a P-polarized light beam $P_2$ obtained by converting the S-polarized light beam are synthesized. Accordingly, the light beam 114 has an ellipsoidal cross section as is shown in FIG. 33B. The ratio of major axis to minor axis is approximately 2:1.

In an LCD apparatus such as a liquid crystal projector, the light from the liquid crystal panel and a liquid crystal light valve having a polarizing plate is projected on a screen to display a video image. As the ratio of the area of the light beam which can be incident on the liquid crystal panel with respect to the entire are of the light beam is higher, the light utilization efficiency is higher.

FIG. 34 shows a profile of a liquid crystal panel 116 and a shape of the light beam 114 directed to the liquid crystal panel 116. The liquid crystal panel 116 has a generally used ratio of horizontal side to vertical side of 4:3. The light beam 114 has a ratio of major axis to minor axis of 2:1. In FIG. 34, the light beam 114 has such an area as to circumscribe the liquid crystal panel 116. The light utilization efficiency, namely, the ratio of the area of the liquid crystal panel 116 with respect to the total area of the light beam 114 is approximately 59%.

The light transmitted through the liquid crystal panel is projected on the screen through a projection lens to display a video image. As the brightness of the video image is higher, the video image is easier to watch. For example, if the illuminance of the screen is sufficiently high, the video image is sufficiently bright to watch even if the room is dark. The brightness of the video image on the screen heavily depends on how much light can be incident on the liquid crystal panel. An increased light utilization efficiency in the liquid crystal panel is strongly demanded. However, when the light beam incident on the liquid crystal panel has a circular cross section, the light utilization efficiency, namely, the ratio of the area of the liquid crystal panel with respect to the area of the light beam is 59% at the maximum, which is not sufficient for the screen.

Figure 24:
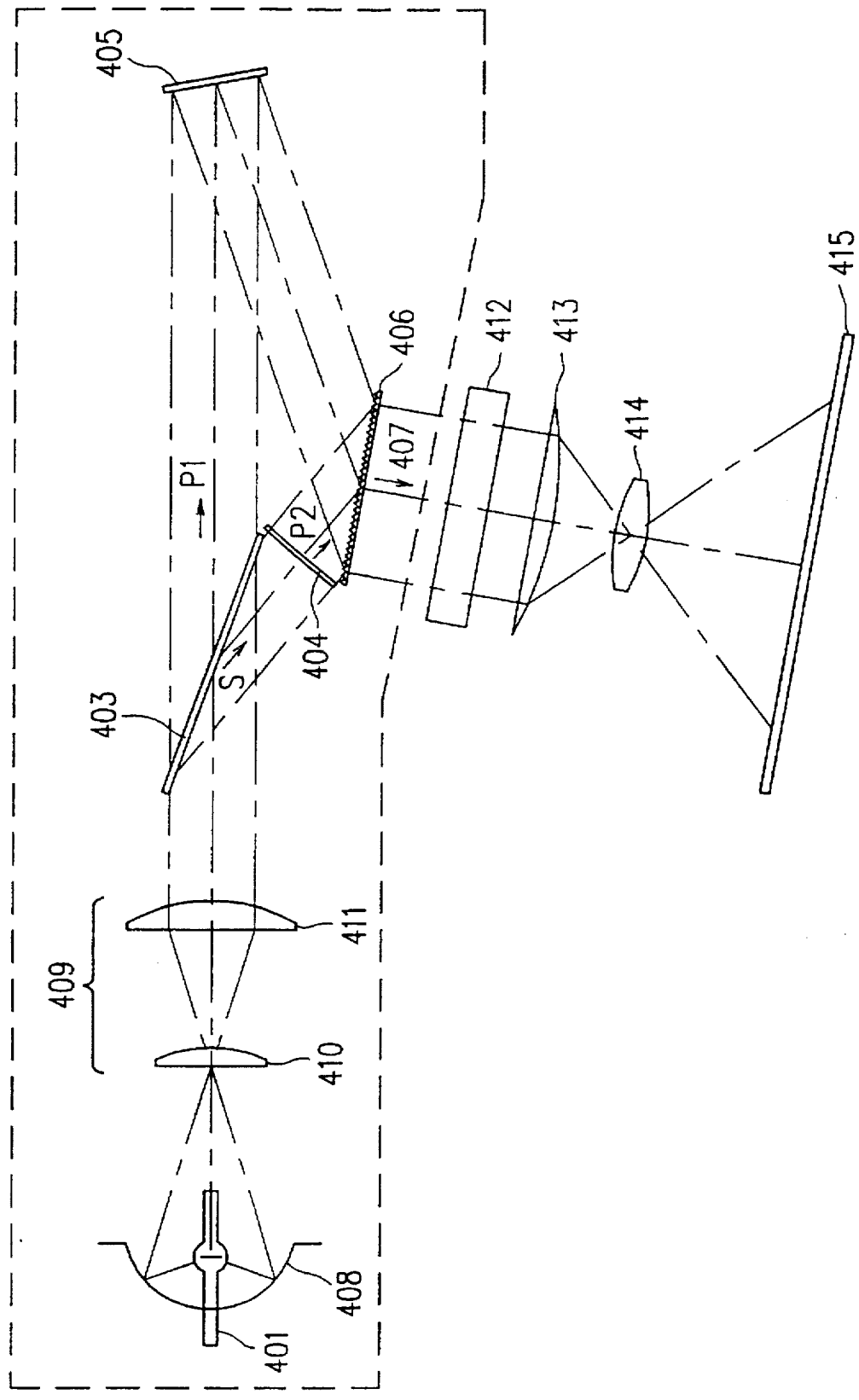
FIG. 24 is a schematic view of an LCD apparatus in a sixth example according to the present invention.

FIG. 24 is a schematic view of an LCD apparatus providing a higher light utilization efficiency in a sixth example.

The LCD apparatus is a liquid crystal projector which includes a polarization direction conversion optical system 400, a liquid crystal light valve 412, a field lens 413, a projection lens 414, and a screen 415. The liquid crystal light valve 412 includes a liquid crystal panel and at least one polarizing plate. The polarization direction conversion optical system 400 includes a light source 401 for emitting white light such as a metal halide lamp, a halogen lamp or a xenon lamp, an ellipsoidal mirror 408, a light beam shaping section 409 including a cylindrical lens 410 and a plano-convex lens 411, a polarized beam splitter 403 as a light splitting device, a half wave plate 404, a mirror 405, and a synthesizing prism 406. The synthesizing prism 406 has the same structure as the synthesizing prism 106 in the first example. Light 407 emitted from the polarization direction conversion optical system 400 is projected on the screen 415 via the liquid crystal light valve 412, the field lens 413 and the projection lens 414.

The polarization direction conversion optical system 400 operates in the following manner.

The light from the light source 401 is reflected by the ellipsoidal mirror 408 and collected to have a substantially circular cross section. Then, the light is collimated by the light beam shaping section 409 to have a substantially ellipsoidal cross section.

The light beam shaping section 409 includes the cylindrical lens 410 for reducing the light beam only in one direction and the plano-convex lens 411. The cylindrical lens 410 is structured to reduce the light beam in the direction in which the light beams from the synthesizing prism 406 are synthesized, namely, in the direction in which the P-polarized light beams $P_1$ and $P_2$ are disposed. The light beam having the circular cross section incident on the light beam shaping section 409 is first reduced in one direction by the cylindrical lens 410 to have an ellipsoidal cross section and then collimated by the plano-convex lens 411.

The light from the light beam shaping section 409 is split into a P-polarized light beam $P_1$ and an S-polarized light beam S by the polarized beam splitter 403. The P-polarized light beam $P_1$ is transmitted through the polarized beam splitter 403, and the S-polarized light beam S is reflected by the polarized beam splitter 403. The S-polarized light beam S is transmitted through the half wave plate 404 to have the polarization plane thereof rotated at 90 degrees to become a P-polarized light beam $P_2$, and is incident on the synthesizing prism 406. The P-polarized light beam $P_1$ is reflected by the mirror 405 and then is incident on the synthesizing prism 406. The two light beams $P_1$ and $P_2$ exit the polarization direction conversion optical system 400 as the light beam 407 having a single polarization plane. The light beam 407 is directed to the liquid crystal light valve 412 including a liquid crystal panel and a polarizing plate, and then is projected on the screen 415 via the field lens 413 and the projection lens 414.

FIG. 25A shows a shape of the incident light on the polarized beam splitter 403 after the light is shaped by the light beam shaping section 409. The cross section of the incident light is an ellipse, where the ratio of minor axis to major axis is 1:2. The direction of the minor axis is the same as the direction in which the P-polarized light beam $P_1$ and the P-polarized light beam $P_2$ are synthesized as the light beam 407 by the synthesizing prism 406. Accordingly, the light beam 407 has a substantially circular cross section as is shown in FIG. 25B.

FIG. 26 shows a profile of the liquid crystal panel 416 and a shape of the light beam 407 directed to the liquid crystal panel 416 obtained in the case where the light beam 407 emitted from the synthesizing prism 406 is circular. In the liquid crystal panel 416, the generally used ratio of horizontal side to vertical side is 4:3. The light beam 407 has such an area as to circumscribe the liquid crystal panel 416. The light utilization efficiency, namely, the ratio of the area of the liquid crystal panel 416 with respect to the total area of the light beam 407 is approximately 61%. The light utilization efficiency is slightly higher than that obtained in the first example without light beam shaping.

Figure 27A:
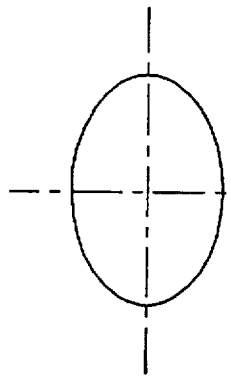
FIG. 27A shows another shape of an incident light on a polarized beam splitter after the light is shaped.
Figure 27B:
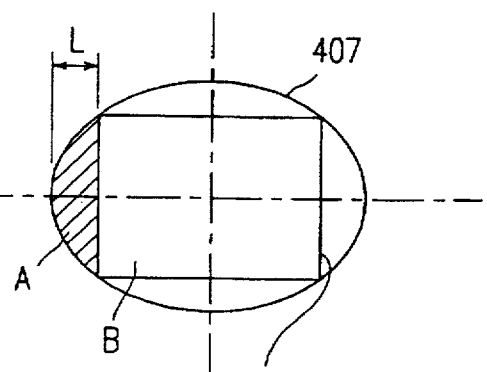
FIG. 27B shows a profile of the liquid crystal panel and the shape of light directed to the liquid crystal panel in the case where the light shown in FIG. 27A is incident on the polarized beam splitter.

FIG. 27A shows another shape of the light incident on the polarized beam splitter 403. In this case, the ratio of minor axis to major axis of the ellipsoidal cross section is 2:3. FIG. 27B shows the profile of the liquid crystal panel 416 and the shape of the light beam 407 incident on the liquid crystal panel 416 in the case where the light beam 407 shown in FIG. 27A is incident on the polarized beam splitter 403. In this case, the ratio of horizontal side to vertical side of the liquid crystal panel 416 is M:N. The ratio of major axis to minor axis of the ellipsoidal cross section of the light beam 407 is N:M/2. Herein, M=4, and N=3. In this case, the ratio of the area of the liquid crystal panel 416 with respect to the total area of the cross section of the light beam 407 is approximately 64%. By optimizing the shape of the ellipsoidal cross section of the light beam incident on the polarized beam splitter in this manner, the light utilization efficiency can be further improved.

In order to further improve the light utilization efficiency, the light beam which is directed outside the liquid crystal panel is moved to be directed to inside of the liquid crystal panel. For example, the light in area A in FIG. 27B is moved to inside area B to be utilized. In such a case, the incident angle of the light beam 407 on the liquid crystal panel 416 may cause a problem. The incident angle of light incident on the liquid crystal panel to be transmitted therethrough is restricted. A tolerable range of incident angles is set in accordance with the characteristics of the liquid crystal panel 416. If the incident angle is outside the tolerable range, phenomena such as color blurs or color mixing occur. In order to avoid such disadvantages, a member (not shown) for restricting the incident angle is provided on the plane of the liquid crystal panel 416 on which the light is incident.

If light is incident at an angle outside the tolerable range, namely, if the incident light is not sufficiently collimated, the light amount which is rejected for entry by the member for restricting the incident angle. The light utilization efficiency is not improved. By moving the light in area A to area B, the moved light is incident on the liquid crystal panel 416 at an angle in correspondence with the moving distance although the light beam 407 is emitted entirely from the polarized beam splitter 403 toward the liquid crystal panel 416. As the moving distance is longer, the incident angle on the liquid crystal panel 416 is larger. Thus, the incident angle may undesirably exceed the tolerable range, in which case the light cannot be incident on the liquid crystal panel 416. Accordingly, the moving distance needs to be restricted in order to make the light incident on the liquid crystal panel 416 with certainty.

When the liquid crystal panel 416 is used in which the ratio of horizontal side to vertical side is 4:3, the distance by which the light in area A is moved is M (FIG. 34) and L (FIG. 27B) in the above-described cases. L is approximately half of M. This means that the incident angle of the moved light is smaller when the light to be incident on the polarized beam splitter 403 is shaped to have an ellipsoidal cross section in which the ratio of major axis to minor axis is 3:2 than when the light is shaped to have a circular cross section. The possibility that such light is incident on the liquid crystal panel is higher in the latter case.

EXAMPLE 7

Figure 28:
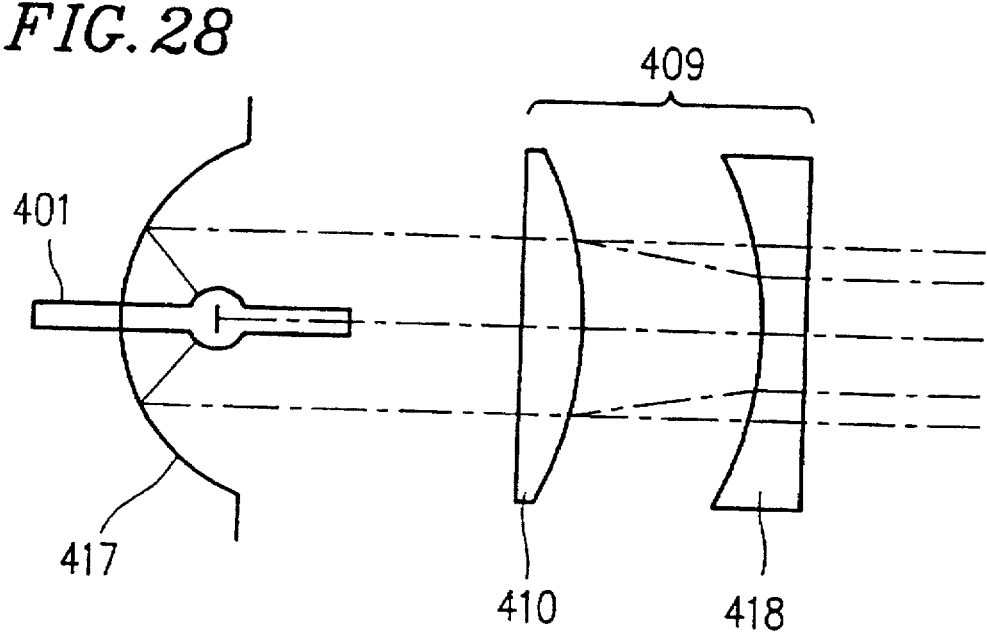
FIG. 28 is a partial schematic view of an LCD apparatus in a seventh example according to the present invention.

FIG. 28 is a partial schematic view of an LCD apparatus in a seventh example according to the present invention. In this example, the ellipsoidal mirror 408 in the sixth example is replaced with a paraboloidal mirror 417. The plano-convex lens 411 is replaced with a plano-concave cylindrical lens 418. The LCD apparatus in this example has the same structure with that of the LCD apparatus in the sixth example except for these points. Identical elements as those in the sixth example will bear identical reference numerals therewith and description thereof will be omitted.

White light emitted from the light source 401 is reflected by the paraboloidal mirror 417 to be substantially collimated to have a substantially circular cross section. The collimated light beam is reduced in one direction by the cylindrical lens 410 and thus collected in one direction to have a substantially ellipsoidal cross section. The cylindrical lens 410 is arranged so that the direction in which the light beam is reduced, namely, the direction of the minor axis of the ellipsoidal cross section is the same as the direction in which the P-polarized light beams $P_1$ and $P_2$ are disposed. The light beam collected in one direction is again collimated by the plano-concave cylindrical lens 418 to be a collimated light having an ellipsoidal cross section. Such a light beam is incident on the polarized beam splitter 403. The light emitted from the shaping prism 420 is incident on the polarized beam splitter 403.

EXAMPLE 8

Figure 29:
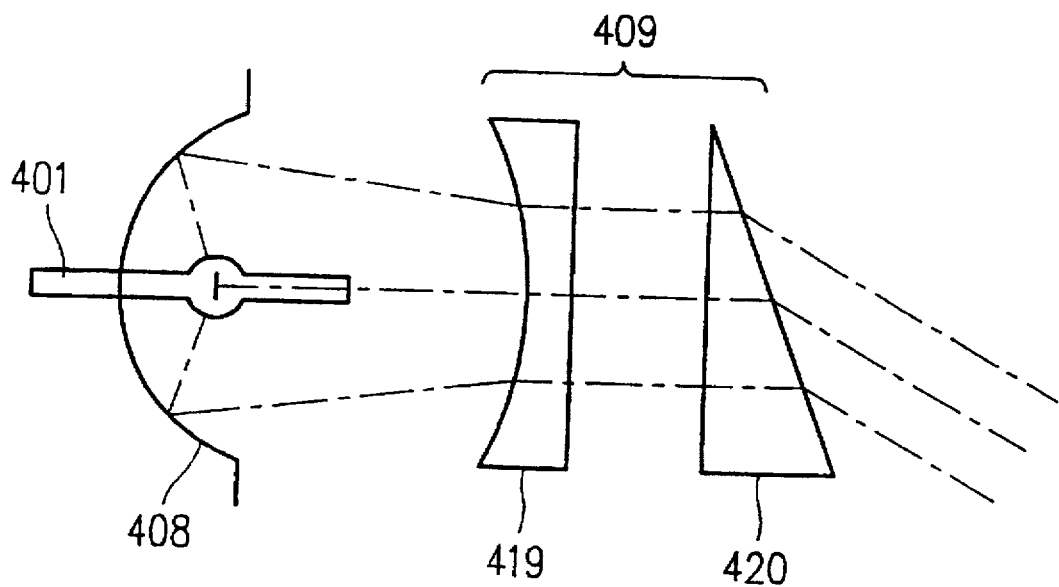
FIG. 29 is a partial schematic view of an LCD apparatus in an eighth example according to the present invention.

FIG. 29 is a partial schematic view of an LCD apparatus in an eighth example according to the present invention. The light beam shaping section 409 includes a plano-concave lens 419 and a shaping prism 420. The LCD apparatus has the same structure as the LCD apparatus in the sixth example except for this point. Identical elements as those in the sixth example will bear identical reference numerals therewith and description thereof will be omitted.

White light emitted from the light source 401 is reflected by the ellipsoidal mirror 408 to be a collected light beam having a substantially circular cross section. The collected light beam is incident on the plano-concave lens 419 to be a collimated light having a prescribed size of cross section, and then is incident on the shaping prism 420. The light is reduced only in one direction by the shaping prism 420 to have an ellipsoidal cross section. The direction in which the shaping prism 420 reduces the light is set to be the same as the direction in which the P-polarized light beams $P_1$ and $P_2$ are disposed.

EXAMPLE 9

Figure 30A:
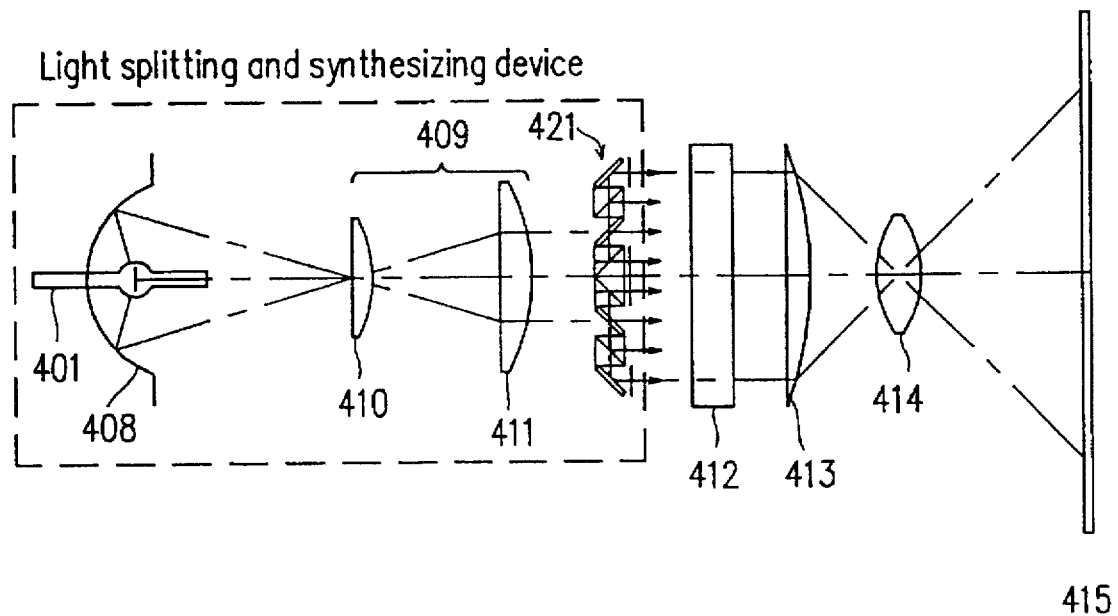
FIG. 30A is a plan view of an LCD apparatus in a ninth example according to the present invention.
Figure 30B:
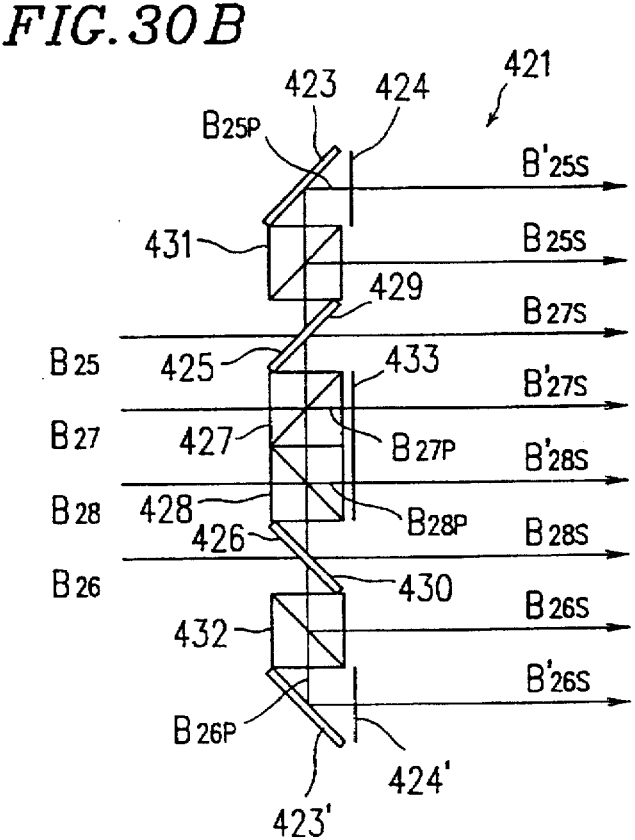
FIG. 30B is an enlarged plan view of a polarized beam splitter of the LCD apparatus shown in FIG. 30A.

FIG. 30A is a plan view of a liquid crystal projector including a polarization direction conversion optical system using a prism-type polarized beam splitter 421 in a ninth example according to the present invention. FIG. 30B is an enlarged plan view of the prism-type polarized beam splitter 421. Identical elements as those in the sixth example will bear identical reference numerals therewith and description thereof will be omitted.

The prism-type polarized beam splitter 421 operates in the following manner.

Light from the light source 401 is collimated by the light beam shaping section 409 and then is split into four light beams $B_{25}$, $B_{26}$, $B_{27}$ and $B_{28}$, which are incident on mirrors 425 and 426 and polarized beam splitters 427 and 428, respectively.

The light beam $B_{27}$ incident on the polarized beam splitter 427 is split into a P-polarized light beam $B_{27P}$ transmitted through a light splitting plane of the polarized beam splitter 427 and an S-polarized light beam $B_{27S}$ reflected by the light splitting plane. The light beam $B_{28}$ incident on the polarized beam splitter 428 is split into a P-polarized light beam $B_{28P}$ transmitted through a light splitting plane of the polarized beam splitter 428 and an S-polarized light beam $B_{28S}$ reflected by the light splitting plane. The P-polarized light beams $B_{27P}$ and $B_{28P}$ are converted into S-polarized light beams $B'_{27S}$ and $B'_{28S}$ by a λ/2 plate 433. Such converted light beams $B'_{27S}$ and $B'_{28S}$ travel rightward in FIGS. 30A and 30B. The S-polarized light beams $B_{27S}$ and $B_{28S}$ are reflected by mirrors 429 and 430 respectively to also travel rightward.

The light beams $B_{25}$ and $B_{26}$ are reflected by the mirrors 425 and 426 so as to be incident on the polarized beam splitters 431 and 432, respectively. The light beam $B_{25}$ is then split into a P-polarized light beam $B_{25P}$ transmitted through a light splitting plane of the polarized beam splitter 431 and an S-polarized light beam $B_{25S}$ reflected by the light splitting plane. The light beam $B_{26}$ is split into a P-polarized light beam $B_{26P}$ transmitted through a light splitting plane of the polarized beam splitter 432 and an S-polarized light beam $B_{26S}$ reflected by the light splitting plane. The S-polarized light beams $B_{25S}$ and $B_{25S}$ are emitted rightward in FIGS. 30A and 30B. The P-polarized light beams $B_{25P}$ and $B_{26P}$ respectively have the travelling direction thereof changed to rightward by the mirrors 423 and 423' and then converted into S-polarized light beams $B'_{25S}$ and $B'_{26S}$ by λ/2 plates 424 and 424' before being emitted from the polarization direction conversion optical system.

FIG. 31A shows a shape of the incident light on the prism-type polarized beam splitter 421. The incident light beam has a circular cross section. FIG. 31B shows a shape of the light emitted from the polarized beam splitter 421 which is obtained from the incident light shown in FIG. 31A. The emitted light indicated by letter T has an ellipsoidal cross section in which the ratio of major axis to minor axis is 2:1.

FIG. 32A shows another shape of the incident light on the prism-type polarized beam splitter 421. The incident light beam has an ellipsoidal cross section in which the ratio of major axis to minor axis is 2:1. The FIG. 32B shows a shape of the light emitted from the polarized beam splitter 421 which is obtained from the incident light shown in FIG. 32A. The emitted light indicated by letter Q has a substantially circular shape as a result of shaping of the incident light by the light beam shaping section 409 in the polarized beam splitter 421. The direction of the minor axis of the ellipsoidal cross section is the same as the direction in which the P-polarized light beams are synthesized by the polarized beam splitter 421.

In the polarized beam splitter in this example, the relationship between the shape of the light beam incident on and the shape of the light emitted from the polarized beam splitter is almost the same as that in the previous examples. Accordingly, the light utilization efficiency is enhanced by shaping the incident light beam to be ellipsoidal as in the previous examples.

Figure 35:
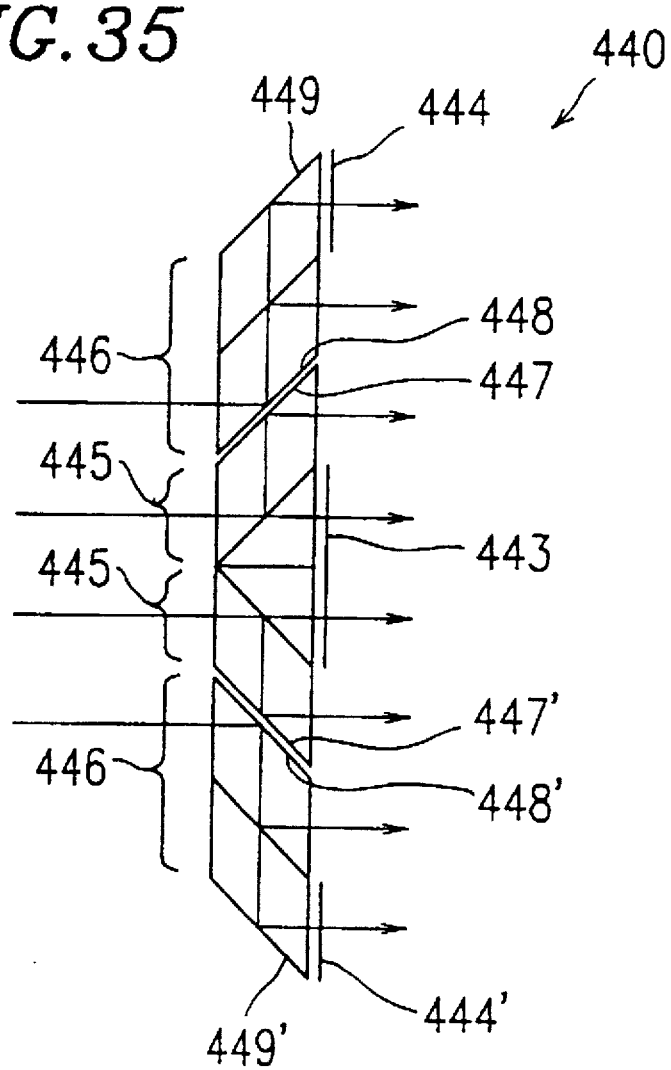
FIG. 35 shows another polarized beam splitter in the LCD apparatus shown in FIG. 30B.
Figure 36:
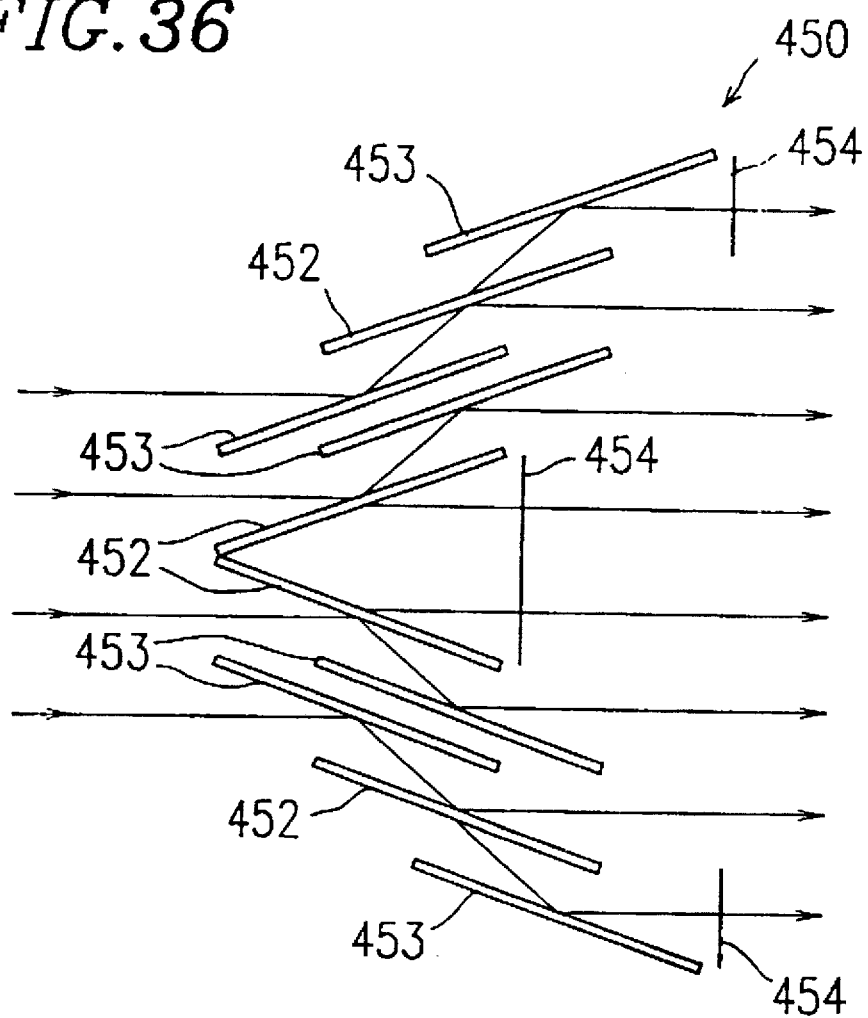
FIG. 36 shows still another polarized beam splitter in the LCD apparatus shown in FIG. 30B.

Instead of the prism-type polarized beam splitter 421, a prism-type polarized beam splitter 440 shown in FIG. 35 or a plate-type polarized beam splitter 450 shown in FIG. 36 can also be used.

The prism-type polarized beam splitter 440 in FIG. 35 includes two types of composite prisms 445 and 446. Prism faces 447 and 447' of the composite prism 445 and the prism faces 448, 448', 449 and 449' of the composite prism 446 are used instead of the mirrors 423, 423', 425, 426, 429 and 430 shown in FIG. 30B. The prism faces 447, 447', 448, 448', 449 and 449' realize a reflectivity of almost 100%. The composite prisms 445 and 446 are preferably separated from each other with a little space therebetween in order to make the prism faces 447, 447', 448, 448' total reflection planes. The polarized beam splitter 440 also includes λ/2 plates 443, 444 and 444'.

The plate-type polarized beam splitter 450 in FIG. 36 includes polarized beam splitters 452, mirrors 453 and λ/2 plates 454. By such a structure, the polarization direction is converted in the same manner as in the polarized beam splitters shown in FIGS. 30B and 35.

In the sixth through ninth examples, the light beam shaping section includes a combination of a paraboloidal mirror, a cylindrical lens and a plano-convex lens, a combination of a paraboloidal mirror, a cylindrical lens and a plano-concave cylindrical lens, or a combination of a paraboloidal mirror, a plano-concave lens and a shaping prism. The present invention is not limited to such a combination, and any device which converts the shape of the light beam from a circle into an ellipse can be used.

In the above-described examples, a half wave plate is used in order to rotate the polarization direction of the linearly polarized light. Alternatively, a liquid crystal device including a 90°-twisted nematic liquid crystal material. The same effects are obtained whether the light beams are aligned to a P-polarized light beam or an S-polarized light beam.

As has been described so far, in an LCD apparatus in the sixth through ninth examples, a light source generating white light having different polarization directions is used. Such white light is shaped by a light beam shaping device to have an ellipsoidal cross section so that the minor axis of the ellipsoidal cross section is in the direction in which the two P-polarized light beams are synthesized before being emitted from the polarized beam splitter. Further, in the case where the ratio of horizontal side to vertical side of the liquid crystal panel is M:N, the ratio of major axis to minor axis is N:M/2. The shaped light beam is split into two linearly polarized light beams, namely, a P-polarized light beam and an S-polarized light beam by a polarized beam splitter. The polarization direction of one of the two light beams is changed to align the polarization direction of the two light beams. By such conversion, the light is emitted from the polarized beam splitter to be incident on the liquid crystal light valve has an appropriate shape and an appropriate incident angle for the liquid crystal panel. Thus, the light utilization efficiency on the liquid crystal panel can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus including a liquid crystal display panel, a light source for illuminating the liquid crystal display panel with light and a polarization conversion optical system for linearly polarizing the light in one direction, the polarization conversion optical system comprising:

a pair of first polarized beam splitters for splitting a part of the light from the light source into P-polarized light and S-polarized light by transmitting the P-polarized light and reflecting the S-polarized light, the first polarized beam splitters being adjacent to each other and being arranged to direct the S-polarized light in opposite directions;

a pair of first reflectors, disposed to sandwich the pair of first polarized beam splitters, for reflecting the S-polarized light toward the liquid crystal display panel, each of the first reflectors being formed integrally with a corresponding one of the first polarized beam splitters;

a pair of second reflectors for reflecting the remaining part of the light from the light source, each of the second reflectors being arranged substantially in parallel with and apart from a respective one of the first reflectors;

a pair of second polarized beam splitters, disposed to sandwich the pair of the second reflectors, for splitting the remaining part of the light reflected by the second reflectors into further P-polarized light and further S-polarized light by transmitting the further P-polarized light and reflecting the further S-polarized light toward the liquid crystal display panel;

a pair of third reflectors, disposed to sandwich the pair of second polarized beam splitters, for reflecting the further P-polarized light transmitted through the second polarized beam splitters toward the liquid crystal display panel, each of the third reflectors being formed integrally with a corresponding one of the second polarized beam splitters and a corresponding one of the second reflectors; and polarization changing means, disposed in optical paths of either the P-polarized light and the further P-polarized light or the S-polarized light and the further S-polarized light, for rotating a polarization direction by 90 degrees.

2. A liquid crystal display apparatus according to claim 1, wherein each of the first reflectors, the second reflectors and the third reflectors is a total reflection face of a prism.

3. A liquid crystal display apparatus according to claim 1, wherein the polarization conversion optical system includes a pair of mirrors having opposite surfaces on which the first reflectors and the second reflectors are formed, respectively.

4. A liquid crystal display apparatus according to claim 1, wherein the pair of first polarized beam splitters are integrally formed.

5. A liquid crystal display apparatus according to claim 1, wherein the pair of first reflectors are formed integrally with the pair of the first polarized beam splitters.

6. A liquid crystal display apparatus including:

a light splitting and synthesizing device comprising polarization splitting means for splitting white light into linearly polarized light beams, polarization aligning means for aligning polarization directions of the linearly polarized light beams in one polarization direction, synthesizing means for receiving the linearly polarized light beams arranged in one direction and for emitting the linearly polarized light beams as one light beam, and shaping means for shaping the white light to have an ellipsoidal cross section before the white light is incident on the polarization splitting means, wherein a direction of a minor axis in the ellipsoidal cross section coincides with the direction in which the linearly polarized light beams are arranged when the linearly polarized light beams are synthesized;

a light source for emitting the white light;

a liquid crystal light valve having a liquid crystal display panel, wherein the liquid crystal display panel has a profile in which a ratio of a horizontal length to a vertical length is M to N;

and wherein a ratio of a major axis to the minor axis in the ellipsoidal cross section of the white light to be incident on the polarization splitting means is N to M/2.

7. A light splitting and synthesizing device according to claim 6, further comprising a light source emitting the white light, wherein the white light from the light source converges at the shaping means.

* * * * *